(12) United States Patent
Bommarito et al.

(10) Patent No.: US 6,741,523 B1
(45) Date of Patent: May 25, 2004

(54) MICROSTRUCTURED TIME DEPENDENT INDICATORS

(75) Inventors: G. Marco Bommarito, Stillwater, MN (US); Mieczyslaw H. Mazurek, Roseville, MN (US); Raymond P. Johnston, Lake Elmo, MN (US); David J. Yarusso, Shoreview, MN (US); Curtis L. Larson, Hudson, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/570,785

(22) Filed: May 15, 2000

(51) Int. Cl.$^7$ ............... G01K 5/08; G01K 3/04; G04F 13/00

(52) U.S. Cl. ............ 368/327; 368/89; 116/220; 116/308; 374/102

(58) Field of Search ............ 368/89, 327; 116/216, 116/206, 219; 374/102

(56) References Cited

U.S. PATENT DOCUMENTS

| | | | |
|---|---|---|---|
| 2,337,534 A | 12/1943 | Barber | |
| 2,896,568 A | 7/1959 | Pryor et al. | |
| 3,018,611 A | 1/1962 | Biritz | |
| 3,046,786 A | 7/1962 | Tessem | |
| 3,190,178 A | 6/1965 | McKenzie | |
| 3,243,303 A | 3/1966 | Johnson | |
| 3,480,402 A | 11/1969 | Jackson | |
| 3,520,124 A | 7/1970 | Myers | |
| 3,632,695 A | 1/1972 | Howell | |
| 3,926,402 A | 12/1975 | Heenan | |
| 3,954,011 A | 5/1976 | Manske | |
| 3,999,946 A | 12/1976 | Patel et al. | |
| 4,025,159 A | 5/1977 | McGrath | |
| 4,154,107 A | 5/1979 | Giezen et al. | |
| 4,195,058 A | 3/1980 | Patel | |
| 4,212,153 A | 7/1980 | Kydonieus et al. | |
| 4,212,393 A | 7/1980 | Lenkoff | |
| 4,222,268 A | 9/1980 | Greenberg et al. | |
| 4,229,813 A | 10/1980 | Lilly et al. | |
| 4,292,916 A | 10/1981 | Bradley et al. | |
| 4,349,598 A | 9/1982 | White | |
| 4,382,700 A | 5/1983 | Youngren | |
| 4,408,557 A | 10/1983 | Bradley et al. | |
| 4,428,321 A | 1/1984 | Arens | |
| 4,432,630 A | 2/1984 | Haas | |
| 4,432,656 A | 2/1984 | Allmendinger | |

(List continued on next page.)

FOREIGN PATENT DOCUMENTS

| | | |
|---|---|---|
| DE | 3717025 | 8/1988 |
| FR | 2702046 | 9/1994 |
| FR | 2789486 | 8/2000 |
| JP | 08110384 | 4/1996 |
| WO | WO99/06589 | 2/1999 |
| WO | WO99/65541 | 12/1999 |

(List continued on next page.)

OTHER PUBLICATIONS

Dee Lynn Johnson, Indicating Devices, in *The Wiley Encyclopedia of Packaging Technology*, 400–406 (John Wiley & Sons, 1986).

Theodore P. Labuza, *Shelf–Life Dating of Food*, pp. 41–87 (Food & Nutrition Press, Inc. 1982).

M. Richter et al., Sensors and Actuators, A–62, 1997, 480–483.

ASTM Designation: E 808–936, Standard Practice for Describing Retroreflection.

*Primary Examiner*—David Martin
*Assistant Examiner*—Jeanne-Marguerite Goodwin

(57) ABSTRACT

The invention provides microstructured time dependent indicators including timers, time/temperature indicators, etc. The indicators are preferably highly accurate and easy to read. The invention also includes indicators which are game pieces, calendars, greeting cards, etc. The indicators function by flow of a material through channels of a microstructured substrate.

24 Claims, 15 Drawing Sheets

U.S. PATENT DOCUMENTS

| | | |
|---|---|---|
| 4,542,982 A | 9/1985 | Haas |
| 4,588,258 A | 5/1986 | Hoopman |
| 4,629,330 A | 12/1986 | Nichols |
| 4,643,122 A | 2/1987 | Seybold |
| 4,779,120 A | 10/1988 | Haas |
| 4,812,053 A | 3/1989 | Bhattacharjee |
| 4,895,428 A | 1/1990 | Nelson et al. |
| 4,903,254 A | 2/1990 | Haas |
| 4,917,503 A | 4/1990 | Bhattacharjee |
| 4,938,563 A | 7/1990 | Nelson et al. |
| 4,987,849 A | 1/1991 | Sherman |
| 5,045,283 A | 9/1991 | Patel |
| 5,053,339 A | 10/1991 | Patel |
| 5,058,088 A | 10/1991 | Haas et al. |
| 5,066,098 A | 11/1991 | Kult et al. |
| 5,107,470 A | 4/1992 | Pedicano et al. |
| 5,120,137 A | 6/1992 | Ou-Yang |
| 5,138,488 A | 8/1992 | Szczech |
| 5,317,980 A | 6/1994 | Bono Coraggioso |
| 5,364,132 A | 11/1994 | Haas et al. |
| 5,393,787 A | 2/1995 | Nestegard et al. |
| 5,446,705 A | 8/1995 | Haas et al. |
| 5,450,235 A | 9/1995 | Smith et al. |
| 5,514,120 A | 5/1996 | Johnston et al. |
| 5,650,215 A | 7/1997 | Mazurek et al. |
| 5,667,303 A | 9/1997 | Arens et al. |
| 5,691,846 A | 11/1997 | Benson, Jr. et al. |
| 5,728,446 A | 3/1998 | Johnston et al. |
| 5,959,777 A | 9/1999 | Whitehead |
| 5,999,307 A | 12/1999 | Whitehead et al. |

FOREIGN PATENT DOCUMENTS

| | | |
|---|---|---|
| WO | WO99/65542 | 12/1999 |
| WO | WO99/65593 | 12/1999 |
| WO | WO99/65595 | 12/1999 |
| WO | WO99/65664 | 12/1999 |
| WO | WO99/65704 | 12/1999 |
| WO | WO99/66282 | 12/1999 |
| WO | WO00/42958 | 7/2000 |

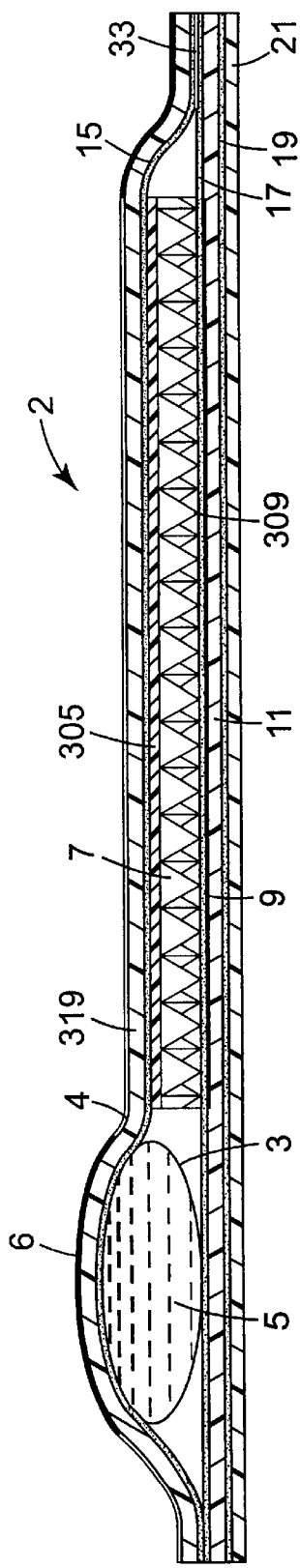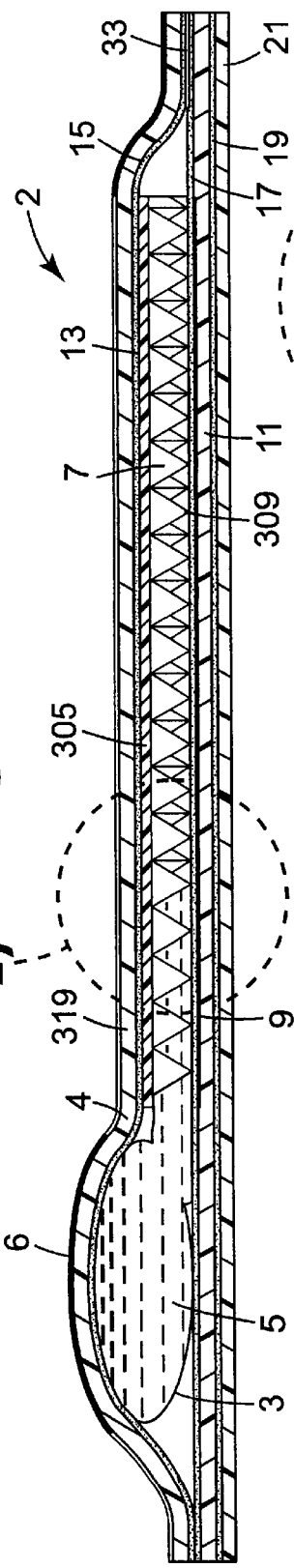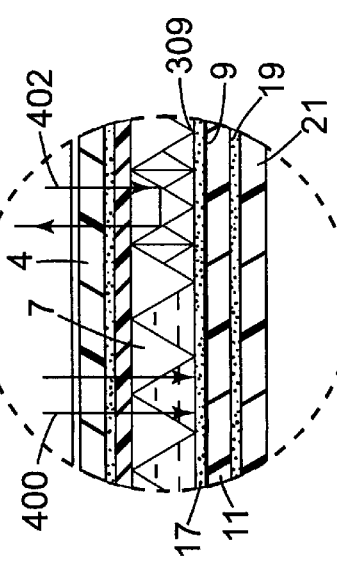

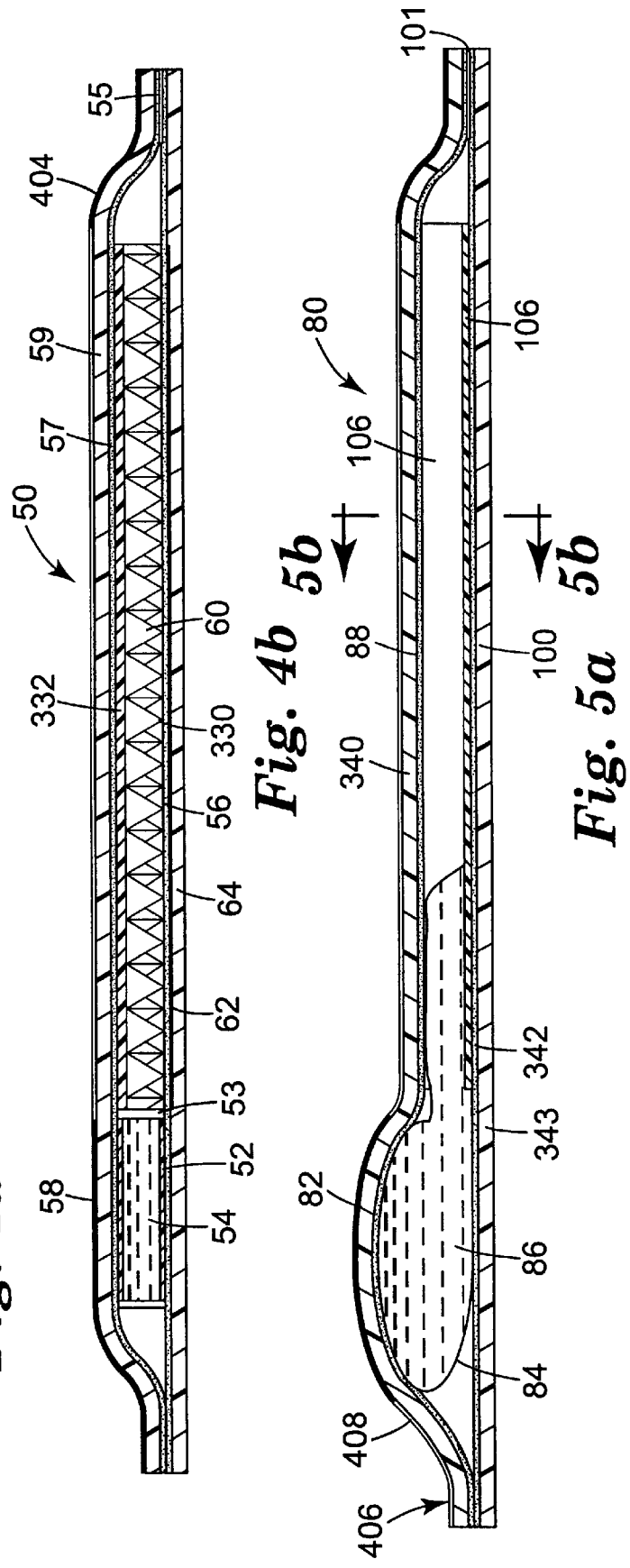
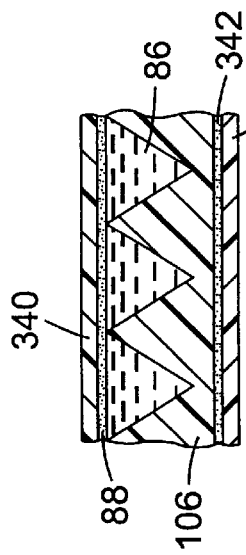
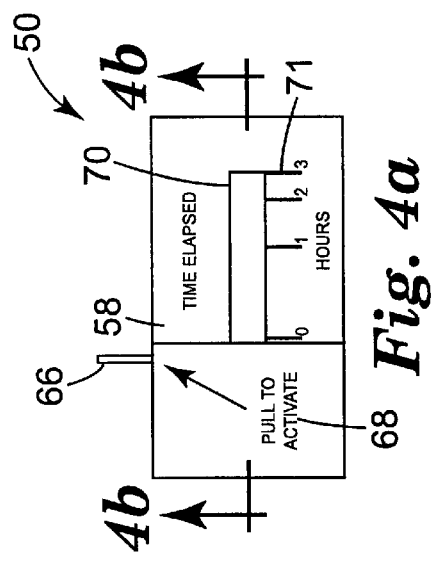

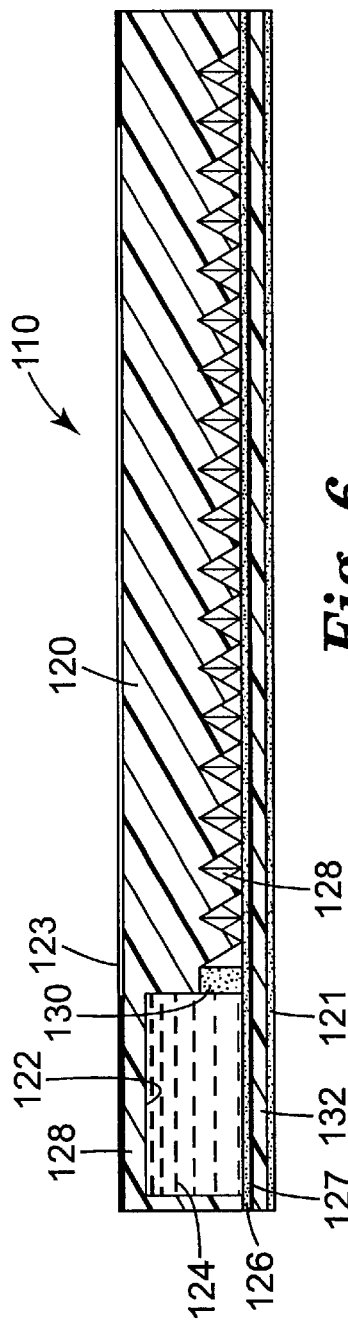
Fig. 6
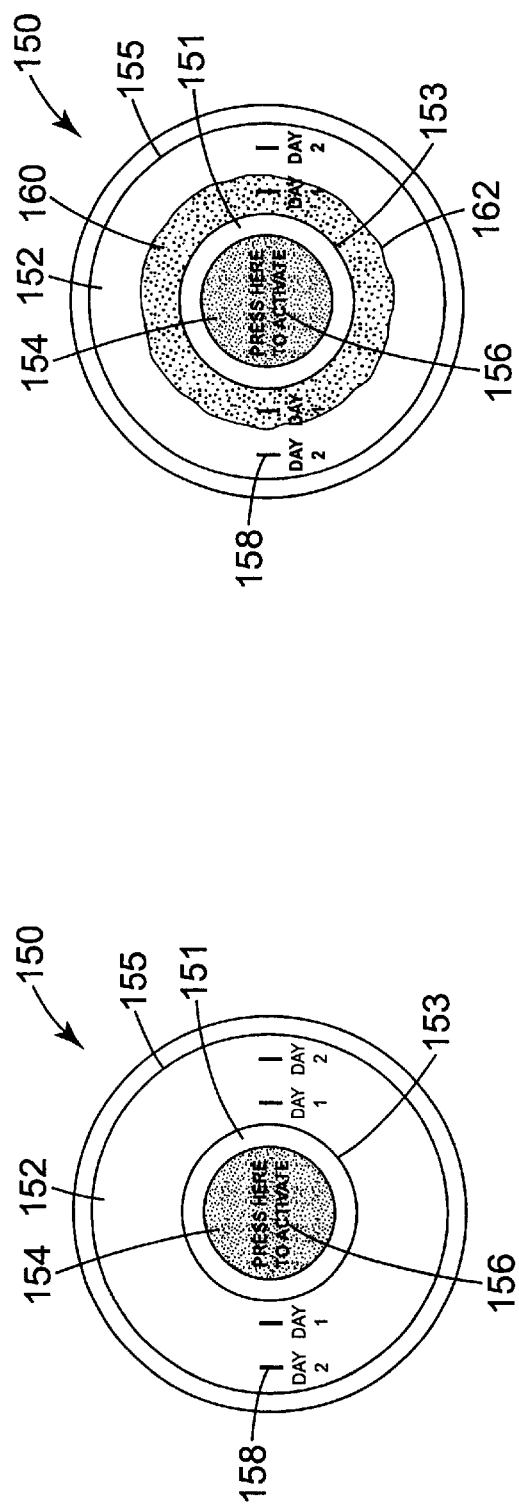
Fig. 7b
Fig. 7a

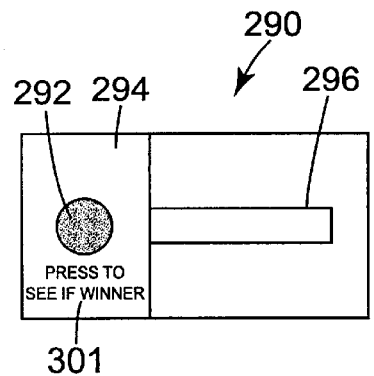
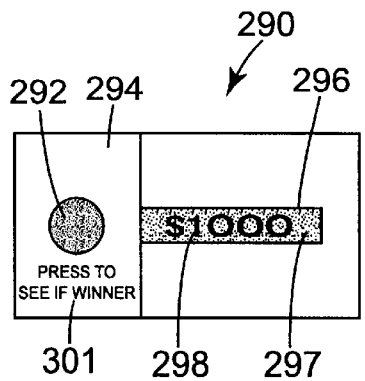
*Fig. 13a*  *Fig. 13b*
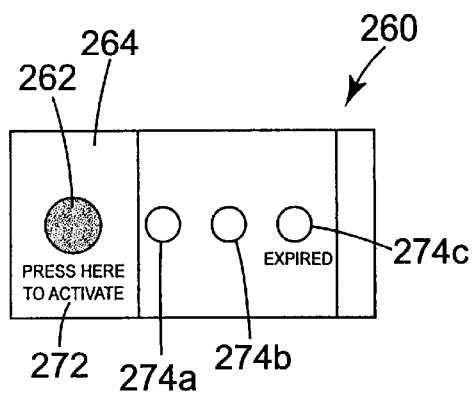
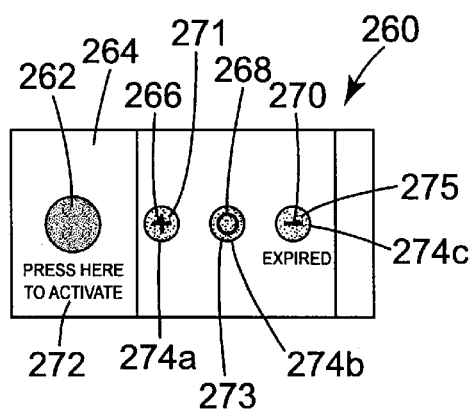
*Fig. 14a*  *Fig. 14b*
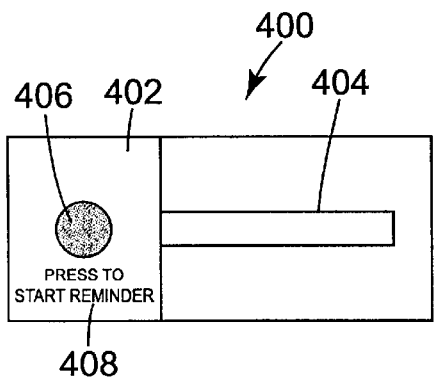
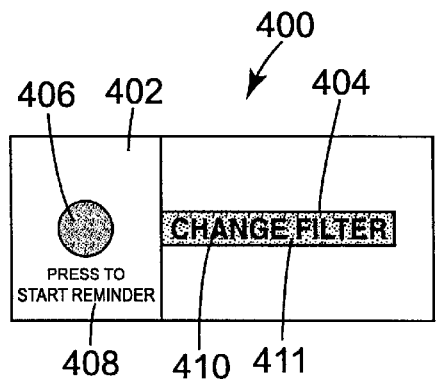
*Fig. 15a*  *Fig. 15b*

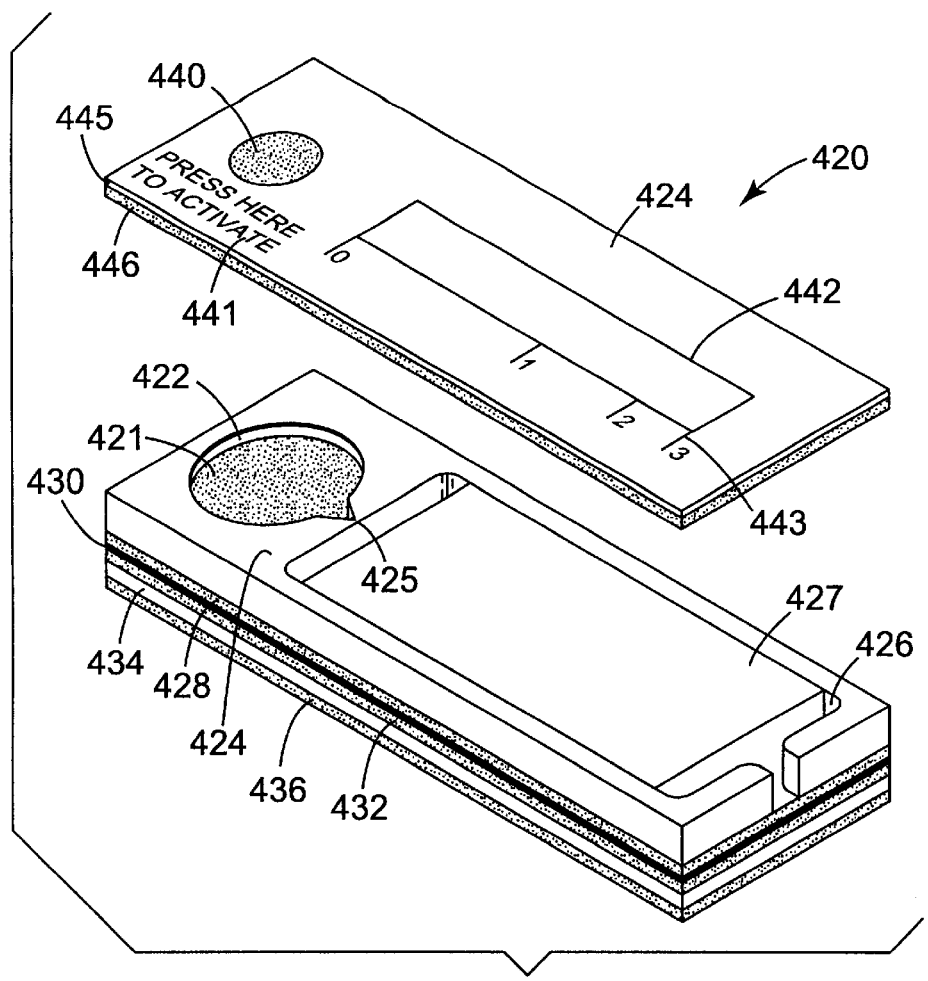
Fig. 16
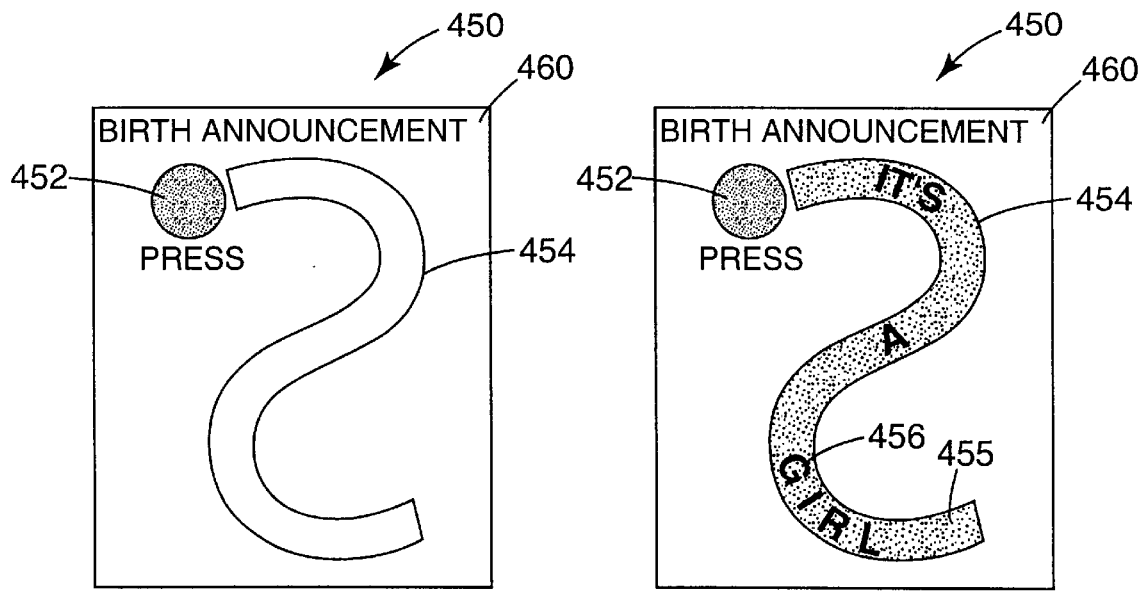
Fig. 17a  Fig. 17b

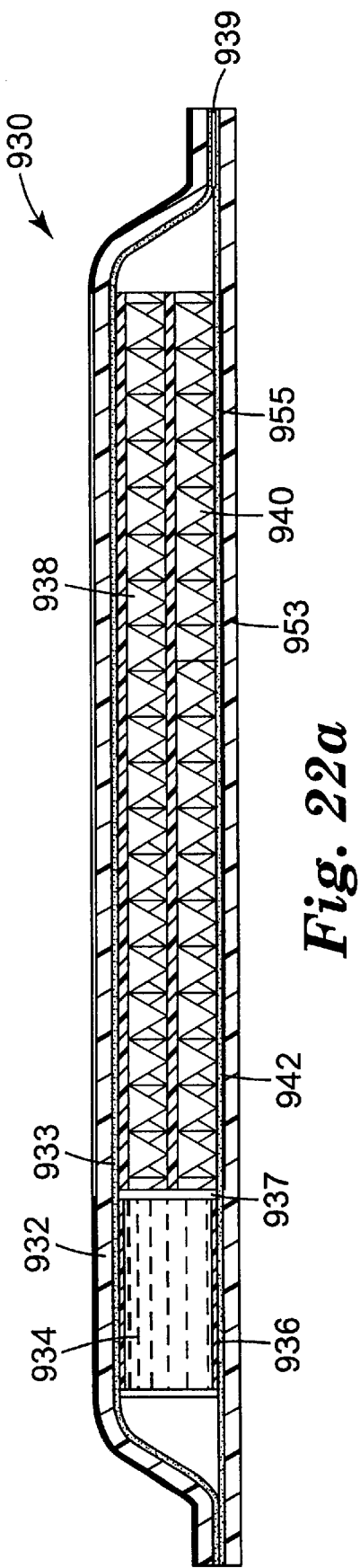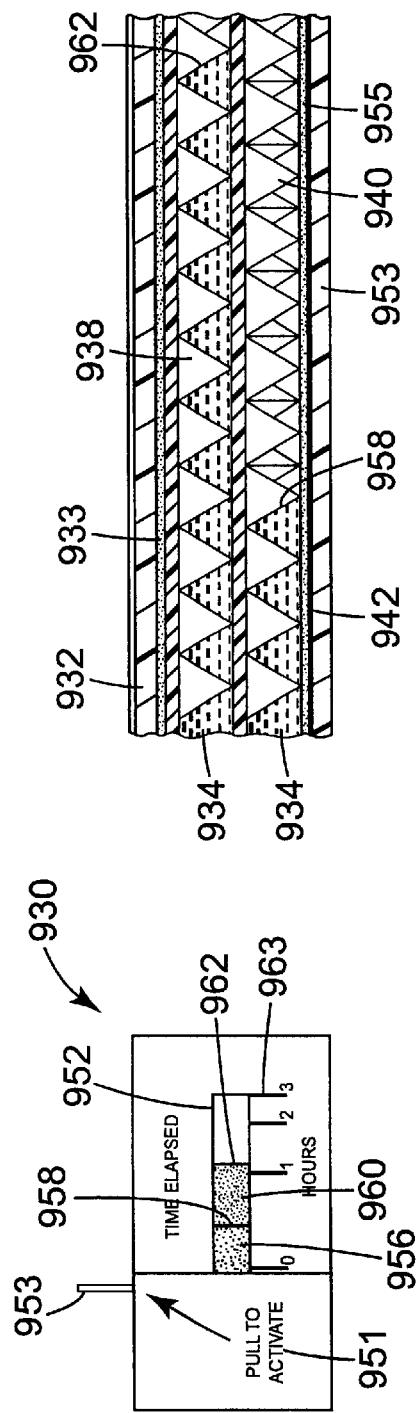
Fig. 22a
Fig. 22b
Fig. 22c

MICROSTRUCTURED TIME DEPENDENT INDICATORS

FIELD OF THE INVENTION

The present invention provides time dependent indicators including but not limited to timers and time/temperature indicators that preferably have a high level of accuracy and are easy to read. The invention also provides indicators that have uses as greeting cards, calendars, announcements, game pieces, novelty items, etc.

BACKGROUND OF THE INVENTION

Applications for time indicators may be divided into two broad categories. The first category requires time indicators that measure not only time but take into account the actual cumulative thermal exposure of the product. This objective is accomplished by having the rate of change of the indicator increase with temperature according to a desired function. Some such indicators exhibit a threshold temperature, below which the indicator does not change. Others respond more continuously to changes in temperature. This type of time indicator is typically referred to as a "time-temperature indicator".

The second category of applications requires time indicators in which the thermal sensitivity is minimized. Thus, in this application the time indicators work much like a timepiece, giving a visual indication of time elapsed. This type of time indicator is frequently referred to as a "timer".

Timers and time-temperature indicators are known which operate by chemical reaction mechanisms, diffusion mechanisms, and capillary driven fluid wicking mechanisms. For a discussion of several types of indicators, reference is made to Dee Lynn Johnson, Indicating Devices, in *The Wiley Encyclopedia of Packaging Technology*, 400–406 (John Wiley & Sons, 1986).

A selectively activated time-temperature integrating device providing a visually observable indication of cumulative thermal exposure is disclosed in U.S. Pat. No. 5,667,303 (Arens, et al.). In this device a viscoelastic material migrates into a porous matrix at a rate varying with temperature and progressively changes the transmissivity of light through the porous film to provide a visually observable indication. The viscoelastic material can comprise a pressure sensititve adhesive. The visually observable indication comprises latent indicia which are not initially visible later and become visible. The device is activated by lamination of a front and back part.

A time-temperature indicator that operates on diffusion properties and provides a visual indication by means of a chemical reaction is disclosed in U.S. Pat. No. 5,053,339 (Patel). This patent discloses a color changing device for monitoring the time-temperature history of perishable products containing an activator tape and an indicating tape. The activator tape contains an activator composition matrix that includes an activating composition such as an organic acid. The indicating tape includes an indicating composition matrix that includes an indicating composition such as an acid-base dye indicator. One or both of the matrices is a pressure sensitive adhesive. The indicator produces a color change as the activating composition diffuses out of the activator matrix and into the indicator matrix and chemically reacts with the indicating composition in the indicating matrix. The color intensifies with time and temperature as more activator composition diffuses into the indicator matrix and reacts.

Another type of indicator is disclosed in U.S. Pat. No. 3,954,011 (Manske). This patent discloses an indicator including a porous fluid carrying pad, a saturant material, a wick material for the saturant, and an indicator means whereby the progress of the saturant from the porous carrying pad along the wick material can be visibly indicated and used to measure the passage of time, the exposure to a given minimum temperature, or a time-temperature relationship. When the saturant is chosen so as to be in a liquid state at the intended storage temperature, the indicator indicates the passage of a time interval as the liquid progresses along the wick. The saturant may instead be selected so as to be solid at desired storage temperatures at which frozen foods are stored and to become liquid at temperatures at which the food is thawed. The saturant will remain solid while the indicator is at the desired storage temperature. The saturant will melt to a penetrating state and then progress along the wick while the indicator is above the predetermined temperature, thereby indicating the passage of time above the predetermined temperature. A plurality of saturant materials having varying freezing points, each having its own wicking path, can be used to indicate time of exposure to discrete predetermined temperature ranges.

Another indicator is disclosed in U.S. Pat. No. 4,428,321 (Arens). This patent discloses a device which provides a visual indication that permissible time within a predetermined temperature range has been exceeded. The device includes an opaque microporous sheet with a colored stratum on its back and a transparent fusible coating bonded to its face. The fusible coating is a solid solution of an amorphous rubbery polymer dissolved in a crystallizable solvent such as wax. The solvent has a melting point below the lower end of the predetermined temperature range and the polymer has a glass transition temperature below the lower end of the predetermined temperature range. Below the melting temperature of the solvent, the composition is a non-penetrating solid. When the indicator is heated to a predetermined temperature, the solid wax solvent melts and dissolves the rubbery polymer, resulting in a liquid penetrating state which gradually penetrates the microporous layer. The refractive index of the polymer and wax composition is essentially the same as that of the solid component of the microporous layer, rendering the microporous layer gradually transparent.

U.S. Pat. No. 4,154,107 (Giezen et al.) describes a time temperature indicating device having an indicator layer and a signaling component in a reservoir which migrates to the indicating layer and causes the indicator layer to undergo a visually perceptible change.

U.S. Pat. No. 2,896,568 (Pryor et al.) discloses a temperature indicating device comprising substances introduced in liquid form into a plurality of wells and frozen in situ, which substances melt and migrate out of the wells as a result of gravity or capillary attraction or both and the migration may be detected by observation.

U.S. Pat. No. 3,999,946 (Patel et al.) describes a time-temperature history indicator, which contains compositions containing at least two conjugated acetylene groups which exhibit sequences of irreversible color changes at combinations of time and temperature. The device may be supported on the surface of a product or on a substrate.

Other types of known time indicators, which are generally short-term time indicators, are based on the gradual diffusion or migration of a substance such as an ink from one substrate through another substrate, i.e. in a path perpendicular to the surface of the substrate. After the ink or other substance migrates through the substrate(s) it is viewed on a display surface to thereby indicate that the predetermined time period has elapsed.

U.S. Pat. No. 4,903,254 (Haas) describes a time indicator comprising a number of layers that are adhered together. The indicator has a front part and a rear part. The rear part comprises an ink pattern layer upon rear support member and the front part comprises a transparent support member and an opaque adhesive layer. The adhesive layer is capable of dissolving the ink pattern and has a front ink display surface. Contacting the front part and rear part activates the dissolution and migration of ink from the ink pattern layer to the front ink display surface.

U.S. Pat. No. 5,364,132 (Haas et al) describes a reusable self-expiring security identification badge including a base substrate having a void indicia area, an ink substrate having an expired indicia area of a soluble ink and an adhesive surface and an overlay substrate having an ink dissolver and a display surface. When the badge is issued, the inked substrate is attached to the base substrate, the inked substrate covering the void indicia area. The overlay substrate is then placed over and attached to the inked substrate, the ink dissolver in contact with the ink substrate. The ink dissolver of the overlay substrate contacts and co-acts with the soluble ink of the inked substrate to dissolve the ink and allow the ink to migrate through to the overlay substrate to the display surface, where it can be visually perceived, in a preselected time interval.

U.S. Pat. No. 3,520,124 (Myers) describes timer device based on two or more reactive materials which react either physically or chemically over a predetermined period to produce a termination signal. The reacting materials are carried on a base member and separated by a barrier preventing contact. Elimination of the barrier commences the timer reaction.

U.S. Pat. No. 4,212,153 (Kydonieus et al.) describes a laminated indicator that changes in a visually perceptible mode with the passage of time. The indicator comprises at least two layers, whereby the molecular migration of an agent in an interior layer to the outermost surface of the exterior layer causes a change which is visually perceptible.

U.S. Pat. No. 5,045,283 (Patel) describes a device comprising an activator tape, which includes an activator composition in an activator matrix, and an indicating tape that includes an indicator composition in an indicator matrix. The tapes are adhesively bound together to form a wedge-shaped composite matrix. The activating composition diffuses through the increasingly thicker composite matrix to contact the indicating composition to produce a visually observable color change at the temperature being monitored. The color change appears as a moving boundary at the color/non-color interface that moves transversely along the length of the device toward the thicker end.

U.S. Pat. No. 5,107,470 (Pedicano et al.) describes a time color indicator comprising first segment comprising a transparent non-permeable web coated on the bottom side with an opaque non-curing coating and a release sheet removably attached to the coating. The top side contains a message printed with an ink containing a migrating agent. The second segment comprises a transparent non-permeable web coated on the bottom side with an opaque non-curing coating. A portion of the bottom side of the second segment is adhered to the first segment top surface, the remainder is covered with a release paper. When the release paper is removed the second segment overlies and adheres to the printed portion of the first segment obscuring the printed area until the printed message migrates through the opaque layer to display the message.

U.S. Pat. No. 5,446,705 (Haas et al.) describes a time indicator that changes color or produces an image or information after a specific time interval. The time indicator includes a base with color dye deposited on a first surface; and a substrate having an adhesive on a first surface thereof, the adhesive positioned at discrete locations on the first surface of the substrate. When the substrate and the base are put into adhesive contact with each other, the adhesive contacts and co-acts with the colored dye to dissolve the dye and permit the dye to migrate through the adhesive to cause a color change visible through the substrate. The discrete adhesive inhibits lateral migration of the dye to preserve the image or information of the dye in a clear and/or understandable condition.

U.S. Pat. No. 4,643,122 (Seybold) describes a diffusion controlled security tag comprising a carrier containing a solution of a compound which changes color upon diffusion or evaporation of the solvent. Preferably, the carrier is enveloped in a barrier film which controls the rate of diffusion/evaporation of the solvent from the carrier, such that a change in color of the carrier indicates undesirable storage or product tampering.

U.S. Pat. No. 5,058,088 (Haas) describes a time indicator which includes a first substrate having first and second surfaces and at least two indicia areas on the first surface. A second substrate having first and second surfaces is also provided. A first chemical agent is provided on each of the indicia areas and a second chemical agent is provided on the first surface of the second substrate. The first surfaces of each substrate overlay and are in contact with each other, the chemical agents coacting to cause a visually perceptible change at one of the second surfaces overlaying the first indicia area in a first selected time interval and a visually perceptible change in said second surface overlaying the second indicia area in a second selected time interval, the first selected time interval differing from the second selected time interval.

Other known timers and time-temperature indicators are based on the migration of liquids or jelly through wicks to indicate the passage of time or thermal exposure.

U.S. Pat. No. 4,229,813 (Lilly et al) describes a time indicator which includes a reservoir of silicone oil contained in a frangible housing which upon crushing releases the silicone oil which is slowly absorbed onto and moves up a porous strip at a rate which is a function of time. One side of the strip is printed with an oil soluble ink, while the other side is unprinted. The printed side of the strip is laminated to an unprinted strip. As the silicone oil moves up the strip, the oil contacts the ink causing a dye in the ink to migrate from the printed side to the unprinted side, thus providing a measurable color front moving up the strip.

U.S. Pat. No. 4,382,700 (Youngren) describes an indicator which contains a capsule of mineral jelly which is in contact with a wick, such that the mineral jelly diffuses into the wick in accordance with the changes in ambient temperature over a period of time. The amount of diffusion is indicated by an apparent change in color of the wick.

U.S. Pat. No. 4,408,557 (Bradley et al.) describes a time indicator wherein a migrating carrier mixture is contained in a confined area above a base layer. An absorptive layer is disposed on the base layer and accepts the carrier mixture at a predetermined rate upon removal of a barrier to activate the timer.

U.S. Pat. No. 4,292,916 (Bradley et al.) describes a time indicator in which components or a carrier mixture react physically and chemically with one or more receptive layers causing prominent changes.

U.S. Pat. No. 4,432,656 (Allmendinger) describes a time/temperature integrator for indicating the history of a deep frozen product through diffusion of water along a cellulose wick.

U.S. Pat. No. 4,629,330 (Nichols) describes a color change indicator of time and temperature. The device includes a reservoir of liquid having a predetermined index of refraction and a rate of evaporation. The liquid is covered by an opacifying layer of microporous material. The opacifying layer has an index of refraction approximately the same as that of a liquid and has an open cell network of pores for absorbing liquid from the reservoir. The layer is in a first radiation scattering condition when the liquid occupies the opacifying layer and after a specified period of time in a second scattering condition when the liquid is depleted from the opacifying layer.

U.S. Pat. No. 3,243,303 (Johnson) discloses a temperature monitor including an absorbent body having an indicating area on a surface thereof, and a fluid composition for producing a visual indication at the indicating area. The fluid composition preferably is arranged for absorption by the absorbent body at a zone remote from the indicating area, and the fluid composition travels to the indicating area under certain temperature conditions and provides a visual indication thereat.

U.S. Pat. No. 4,195,058 (Patel) describes a device for monitoring time-temperature histories in which a vapor is allowed to permeate through a permeable vapor barrier to contact a liquid polydiacetylene indicator to provide a color response after a predetermined period of time.

Other time or time-temperature indicators rely primarily upon chemical reactions to cause a visually perceptible change over a desired time period rather than the migration of fluids or compounds. These indicators rely upon exposure to light and/or oxygen to trigger the chemical reaction. Examples of these types of indicators include U.S. Pat. No. 2,337,534 (Barber), U.S. Pat. No. 3,018,611 (Biritz), U.S. Pat. No. 3,480,402 (Jackson), U.S. Pat. No. 4,432,630 (Haas), U.S. Pat. No. 4,542,982 (Haas), U.S. Pat. No. 4,779,120 (Haas) U.S. Pat. No. 4,812,053 (Bhattacharjee et al.), U.S. Pat. No. 4,917,503 (Bhattacharjee et al.), and U.S. Pat. No. 4,987,849 (Sherman).

SUMMARY OF THE INVENTION

It is desirable to have indicators that can provide a visual indication of a predetermined period of time. This type of indicator would be useful in a variety of applications, such as, for example, monitoring the useful life of a perishable item. Such perishable products include, but are not limited to, foods, food additives such as aspartame, biological materials, drugs, cosmetics, photographic supplies, and vaccines. Time indicators would also be useful to monitor time elapsed and expiration in a variety of applications that do not involve perishable items. For example, security badges could have a time indicator to mark expiration. Time indicators could also be used as reminders that a certain task and/or items need to be completed, replaced or renewed. Time indicators could also be used in novelty items and gaming pieces.

One simple way of providing an indication of when the useful life of a perishable product has expired is to mark each product with a suggested date by which that product should be used. However, there is a shortcoming in this method in that the actual useful life of perishable products is dependent on the temperature history to which the product is exposed because the rate of degradation of a perishable product usually increases with increasing temperature. In other words, a perishable product will generally have a shorter remaining useful life when exposed to a certain period at a relatively high temperature than when exposed to the same period at a relatively low temperature. More broadly, the rate of change of a particular property or characteristic of any material or product may increase with increasing temperature. Therefore, marking a product with a "use by" date must be based on assumptions about the anticipated thermal exposure of the particular product. However, the actual exposure cannot always be predicted or controlled, hence the need for a time-temperature indicator.

Of particular concern is that the rate of degradation or other change at a given temperature is different from product to product, as is the variation in the rate of degradation with temperature. Some products show a greater increase in rate of change for a given temperature increase than other products. One useful way to quantify this is with reference to the $Q_{10}$ of a reaction. The $Q_{10}$ is an indication of how much faster a reaction (such as chemical change, microbial growth, or enzymatic spoilage of a perishable product) occurs in response to a 10° C. increase in temperature wherein T is provided in ° C.:

$$Q_{10} = (\text{Rate of change at } T+10° \text{ C.})/(\text{Rate of change at } T)$$

For example, most perishable foods stored under refrigeration have $Q_{10}$ values based on spoilage by microbial growth, which have $Q_{10}$ ranges from about 2 to 10. In other words, the rate of degradation will increase by a factor of from about 2 to 10, depending on the particular food, in response to an increase in temperature of 10° C. Other perishable items such as drugs, biological materials, and vaccines will likewise show different $Q_{10}$ values for each particular item.

The Arrhenius relationship is also a useful tool for quantifying the effect of temperature on many chemical and physical processes. The Arrhenius relationship is:

$$k = k_o \exp(-E_a/RT)$$

where
  k=the rate constant as a function of temperature T (Kelvin);
  $k_o$=the preexponential factor;
  R=the ideal gas constant (1.99 Kcal/mole K); and
  $E_a$=the activation energy in Kcal/mole.

It is possible to perform experiments with particular perishable items to determine rates of degradation at various temperatures, and then apply the Arrhenius relationship to these experiments to calculate a measured activation energy ($E_a$) for each particular perishable item within a given temperature range. It has been observed that for many perishable items, such data will closely fit the Arrhenius equation, which assumes that $E_a$ is independent of temperature. As with the $Q_{10}$ value, the particular value of $E_a$ will vary with the particular item to be monitored. For a further discussion on the analysis and quantification of the degradation of foods, reference is made to Theodore P. Labuza, *Shelf-Life Dating of Foods*, pp. 41–87 (Food & Nutrition Press, Inc. 1982), incorporated by reference herein.

Therefore, it is seen that there is a need to provide an indicator of cumulative thermal exposure in which the $Q_{10}$ or $E_a$ of the rate of providing a visual indication of cumulative thermal exposure can be approximately matched to the $Q_{10}$ or $E_a$ of the change of the object to be monitored. The indication of cumulative thermal exposure can thereby be approximately matched to the cumulative degradation of the object to be monitored.

This is not the case for time indicators that are meant to be used as timers. Timers should have a minimal dependence on temperature. A perfect timer would have a $Q_{10}$ value of 1 or alternatively an $E_a$ value of 0. However, virtually any timer will be slightly dependent on temperature.

For both time-temperature indicators and timers it is also desirable to provide an indicator that has an inactivated state in which it may be stored at varying temperatures for long periods of time without changing. While in some cases it may be acceptable to activate the indicator while it is being fabricated, it is preferable that the indicator be capable of selectively being switched to an activated state before, after, or at the time it is affixed to an object to be monitored, after a container is filled with contents to be monitored, after opening a container of contents to be monitored, or at any other desired time after the indicator is fabricated. Such an indicator, whether activated or inactivated, should not be deleteriously affected by environmental factors such as humidity and light.

A problem that generally exists in both time-temperature indicators and timers that rely upon a color change to indicate the passage of time, is that they gradually change color over a long period of time and it is difficult to ascertain the actual completion of the time interval. Earlier time indicator technologies are generally based on color changes that occur by a diffusion process that begins upon activation. In these systems, it is difficult for the observer to identify and determine exactly when the image or color indicates that the predetermined time interval has elapsed. This is because in time indicators based on diffusion, the time interval for the image or color appearance is proportional to the predetermined time for which the time indicator has been designed. Thus, for example, in a three month indicator, the time indicator stays in its "off" state for about a month, after which, the entire indicator starts to change color. After about three months, the observer sees a definite color change of, say 10–20% tint. During the time interval between one and three months, the time indicator is in a "grey area", i.e., "The Grey Time", between expired and unexpired and is subject to interpretation by the viewer. This lack of a sharp transition time is the problem with known time indicators based on diffusion.

Other indicators that utilize fluid migration along a wick while not subject to the Grey Time problem have other drawbacks. These indicators, because of the nature of the wicking materials, suffer from the drawback of accuracy and repeatability in the measurement of time or time and temperature. The wicking materials unlike the microstructed substrates of the invention do not have a predetermined structure. Since the pore structure in wicking material is not easily controlled, the behavior of the indicator is often insufficient for timing or time/temperature indicator needs.

The articles of the invention are preferably capable of solving the problems with the known indicator devices.

The present invention provides time dependent indicators including but not limited to timers and time/temperature indicators that preferably have a high level of accuracy and are easy to read.

The articles of the invention are preferably self-contained and preferably allow for activation on demand. By appropriate selection of the fluid (temperature sensitive or relatively temperature insensitive, for example) the article may function, for example, as a time/temperature indicator or a timer. The article is preferably capable of providing a highly accurate readout on progress and end-point determination.

The articles of this invention can optionally be made to comprise innocuous and nonreactive materials, thus providing a safer article over those which do not employ such materials. Preferably the article of the invention can remain in an inactivated state for a long period of time without suffering deleterious affects.

One aspect of the present invention provides an article comprising:
(a) at least one substrate, each substrate(s) having a microstructured surface, wherein the microstructured surface of each substrate defines a plurality of channels;
(b) at least one fluid, wherein the fluid(s) are separated from the substrate(s) until activation of the article is desired;
wherein the article is designed such that it can be manipulated at a desired point in time to allow contact of the fluid(s) with at least some of the channels of at least one of the substrate(s) in order to activate the article; and
wherein the article is designed in such a manner as to provide an indication of the progress of the fluid(s) as it migrates through the channels of the substrate(s).

An article of the invention may comprise only one fluid and only one substrate, for example. In some embodiments the article of the invention may comprise a plurality of the fluids. In some embodiments of the invention the article may comprise a plurality of the substrates. In some embodiments of the article of the invention the article may comprise a plurality of the fluids and a plurality of the substrates.

Preferably the channels of each of the substrate(s) are interconnected. Preferably each fluid is selected from the group consisting of viscous fluids, viscoelastic fluids, and combinations thereof.

In some embodiments of the article of the invention each substrate may be retroreflective such as a cube-corner retroreflective sheeting.

In one embodiment of an article of the invention each substrate is retroreflective and wherein the progress of each fluid as it migrates through the channels is evidenced by frustration of the total internal reflectance in the retroreflective substrate.

In a preferred article of the invention the article is designed such that there is essentially no leakage of fluid(s) from the article prior to or subsequent to activation.

In the article of the invention each fluid has a fluid flow front as it migrates through the channels and each fluid front variation is preferably less than about 5 mm, more preferably less than about 3 mm, and most preerably less than about 1 mm.

The article of the invention may, for example, be selected from the group consisting of timers, time/temperature indicators, game pieces, greeting cards, announcements, invitations, calendars, etc.

When the article is a timer it may according to the Capillary Action Test Method display a time when in a vertical position within about ±50 percent, more preferably about ±25 percent, and most preferably about 10 of an identical timer in a horizontal position.

In some embodiments wherein the article is a timer, the article may display a time at an expiration point which is within about ±25 percent of the actual elapsed time, more preferably within about ±10 percent of the actual elapsed time, and most preferably within about ±5 percent of the actual elapsed time.

In one embodiment of the article of the invention each substrate has two opposing major surfaces, one being identified as the first major surface and the other being identified as the second major surface, wherein the second major surface has a series of essentially parallel channels therein, wherein the channels are essentially of uniform length and uniform shape.

In another embodiment of the article of the invention each fluid is separated from the substrate(s) by a barrier(s) until activation of the article is desired, wherein the barrier can subsequently be manipulated at a desired point in time to allow contact of the fluid(s) with at least some of the channels of at least one of the substrates.

In another embodiment of the article of the invention the article further comprises a covering which sufficiently encases the substrate(s), the barrier(s), and the fluid(s) in such a manner as to allow the fluid(s), upon activation of the article to travel along the channels of the substrate(s) but not to substantially escape from the article, wherein at least a portion of the covering is sufficiently transparent and wherein the coloring and levels of transparency of the covering, substrate(s) and fluid(s) are selected to allow an observer to the view the fluid(s) with the unaided eye as the fluid(s) travel along the substrate channels.

In another embodiment the article of the invention comprises:
(a) a plurality of substrates, each substrate having a microstructed surface, wherein the microstructured surface of each substrate defines a plurality of channels;
(b) a fluid, wherein the fluid is separated from the substrates until activation of the article is desired;
wherein the article is designed such that it can be manipulated at a desired point in time to allow contact of the fluid with at least some of the channels of each substrate, either simultaneously or in any desired order, in order to activate the article; and
wherein the article is designed in such a manner as to provide an indication of the progress of the fluid as it migrates through the channels of each substrate, wherein the article is designed to prevent fluid from migrating from one substrate onto another substrate.

An article of the invention may be designed such that the fluid contacts at least some of the channels of each substrate simultaneously upon activation of the article. In an alternative embodiment an article of the invention may be designed such that the fluid contacts at least some of the channels of each substrate consecutively upon activation of the article.

In another embodiment of the invention the article may comprise a plurality of substrates which are positioned adjacent to each other. In another embodiment of the article of the invention the article may comprise a plurality of substrates which are stacked one upon another. In another embodiment of the invention the article may comprise a plurality of substrates wherein the plurality of substrates are all retroreflective. In another embodiment of the invention the article may comprise a plurality of substrates In another embodiment of the invention the article may comprise a plurality of substrates wherein the plurality of substrates are all non-retroreflective. In another embodiment of the invention the article may comprise a plurality of substrates wherein each of the substrates has a different fluid flow rate with respect to the fluid. In another aspect the article of the invention comprises:
(a) a plurality of substrates, each substrate having a microstructured surface, wherein the microstructured surface of each substrate defines a plurality of channels;
(b) a plurality of fluids, wherein each fluid is separated from the substrates until activation of the article is desired;
wherein the article is designed such that it can be manipulated at a desired point in time to allow contact of each the fluids with at least some of the channels of at least one of the substrates, either simultaneously or in any order desired to activate the article;
wherein the article is designed in such a manner as to provide an indication of the progress of each fluid as the fluid migrates through the channels of ones of the substrates; wherein the article is designed to prevent fluid from flowing from one substrate onto another substrate.

In one embodiment of the article of the invention the number of fluids is equal to the number of substrates. In another embodiment of the article of the invention the article is designed such that each fluid contacts at least some of the channels of a separate substrate simultaneously upon activation of the article. In another embodiment of the article of the invention the article is designed such that each fluid contacts at least some of the channels of a separate substrate consecutively upon activation of the article. In another embodiment of the article of the invention the article comprises a plurality of substrates wherein the plurality of substrates are positioned adjacent to each other. In another embodiment of the article of the invention the article comprises a plurality of substrates the plurality of substrates are stacked one upon another.

In another embodiment of the article of the invention the article comprises a plurality of substrates wherein the plurality of substrates are all retroreflective. In another embodiment of the article of the invention the article comprises a plurality of substrates wherein the plurality of substrates are all non-retroreflective. In another aspect the article of the invention comprises:
(a) at least one substrate having two opposing major surfaces, one being identified as the first major surface and the other being identified as the second major surface, wherein the second major surface is a microstructured surface which defines a plurality of channels, the channels having inlets;
(b) at least one fluid, wherein the fluid(s) are separated from the substrate(s) by a barrier(s) until activation of the article is desired, wherein the barrier(s) can subsequently be manipulated at a desired point in time to allow contact of at least one of the fluid(s) with an end of the second major surface of at least one of the substrate(s) at inlets to at least some of the channels;
(c) a covering which sufficiently encases the substrate(s), the barrier(s), and the fluid(s) in such a manner as to allow the fluid(s), upon activation of the article to travel along the channels of at least one of the substrate(s) but not to substantially escape from the article, wherein at least a portion of the covering is sufficiently transparent and wherein the coloring and levels of transparency of the covering, substrate(s) and fluid(s) are selected to allow an observer to the view the progress of the fluid(s) with the unaided eye as the fluid(s) travels along the substrate channels;
wherein the flow of the fluid(s) through the channels is primarily by capillary action.

In one embodiment of an article of the invention the article is designed wherein one fluid and one substrate is present and wherein the covering comprises a top layer and a lower layer, wherein the flow of fluid is viewed through the top layer of the covering and wherein the first major surface of the substrate is closest to the top layer of the covering and the second major surface of the substrate is closest to the lower layer of the covering.

In one embodiment of an article of the invention the article is designed wherein one fluid and one substrate is present and wherein the covering comprises a top layer and a lower layer, wherein the progress of the flow of fluid is viewed through the top layer of the covering and wherein the second major surface of the substrate is closest to the top layer of the covering and the first major surface of the substrate is closest to the lower layer of the covering.

In another embodiment of an article of the invention having a cover, the cover further comprises a scale which is positioned on a portion of the cover through which the progress of the fluid flow may viewed and which extends in the direction of the fluid flow.

In another embodiment of the article of the invention the article further comprises indicia on the cover indicating how to activate the article.

In another embodiment of the article of the invention having a cover the cover comprises two pieces of tape joined together which encase the substrate(s) and the fluid(s), wherein the first piece of tape is transparent single sided adhesive tape and wherein the second piece of tape is a double sided adhesive tape, wherein the single sided adhesive tape is positioned such that the progress of the flow of fluid(s) can be viewed therethrough and wherein the adhesive coated side of the single sided tape is positioned towards the fluid(s) and the substrate(s).

In another aspect the article of the invention comprises:
(a) at least one substrate, each substrate(s) having a microstructured surface, wherein the microstructured surface of each substrate defines a plurality of channels;
(b) at least one solid, wherein the solid(s) are capable upon exposure to heat of forming a fluid;
wherein the article is designed such that it can be manipulated, if needed, at a desired point in time after the solid(s) form fluid(s) upon exposure to heat to allow contact of the fluid(s) with at least some of the channels of at least one of the substrate(s) in order to activate the article; and
wherein the article is designed in such a manner as to provide an indication of the progress of the fluid as it migrates through the channels of the substrate(s).

In one embodiment of the article of the invention the article is designed such that the fluid contacts at least some of the channels of the substrate(s) upon exposure of the solid to heat to form the fluid without any manipulation of the article needed.

In another embodiment of the article of the invention the solid and the fluid formed from the solid upon exposure to heat are separated from the substrate and the fluid contacts the substrate only upon manipulation of the article in order to activate the article.

The present invention also provides an assembly comprising the article of the invention attached to an item selected from the group consisting of food, food additives, biological material, drugs, cosmetics, photographic supplies, drugs, filters, visitor badges, flowers, air fresheners, insect traps, and parking permits.

The substrates useful in the articles of the invention may have various optical properties including but not limited to those selected from the group consisting of retroreflectivity, diffractive properties, diffusive properties, and partial internal reflective properties.

In one embodiment of the present invention the substrate (s) have optical characteristics and the progress of each fluid as it migrates through the channels of a substrate is evidenced by the frustration of the optical characteristics of the substrate.

Various features discussed herein with respect to articles that contain a fluid would also be useful in articles that contain a solid that upon exposure to heat becomes a fluid to the extent that the features are not inconsistent with the requirement that the fluid is formed from the solid.

As mentioned previously it is preferable that the article of the invention have a high level of accuracy. That is, it is preferred that the article records time elapsed as closely as possible to the actual elapsed time. For example, if an article is marked in hour increments and is designed to expire in four hours, it should as closely as possible match the actual elapsed time throughout its course. For some uses rather than others it would be more important to have a highly accurate timer. The level of accuracy can be measured and compared at any unit along the scale including the expiration point and comparing it to the actual elapsed time. Preferably the accuracy value holds true for at least one unit along the scale (which could for example be the expiration point), more preferably for all the units along the scale. The default unit which is used for this test is the expiration point. Preferably the time indicated on the scale is within about ±50% of the actual time, even more preferably within about ±40% of the actual time, even more preferably within about 30% of the actual time, even more preferably within about ±25% of the actual time, even more preferably within about ±20% of the actual time, even more preferably within about ±15% of the actual time, even more preferably ±10% of the actual time, even more preferably within about ±5% of the actual time, even more preferably within about ±4% of the actual time, even more preferably within about ±3% of the actual time, even more preferably within about ±2% of the actual time, even more preferably within about ±1% of the actual time, even more preferably within about ±0.5% of the actual time, and most preferably the same as the actual time.

BRIEF DESCRIPTION OF THE DRAWINGS

FIG. 1d illustrates a cross-sectional view of the timer article of FIG. 1a taken along line 1d—1d.

FIG. 1e illustrates a cross-sectional view of the timer article of FIG. 1b taken along line 1e—1e.

FIG. 1f illustrates an enlarged cross-sectional view of a section of the article of FIG. 1e which demonstrates the effect of the timer article on incoming light rays.

FIG. 4a illustrates a top view of another embodiment of a timer article of the invention.

FIG. 4b illustrates a cross-sectional view of the timer article of FIG. 4a taken along line 4b—4b.

FIG. 5a illustrates a top view of another embodiment of a timer article of the invention.

FIG. 5b illustrates a partial cross-sectional view of the timer article of FIG. 5a taken along line 5b—5b.

FIG. 6 illustrates a cross-sectional view of another embodiment of a timer article of the invention prior to activation.

FIG; 7a illustrates a top view of another embodiment of a timer article of the invention prior to activation.

FIG. 7b is top view of the timer article of FIG. 7a subsequent to activation but prior to expiration.

Figure 8:
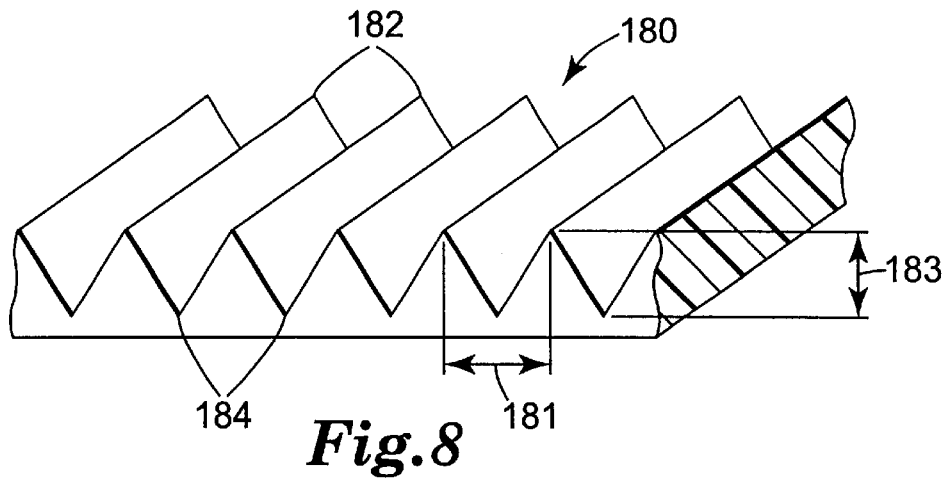

FIG. 8 illustrates a perspective view of an embodiment of a substrate which is useful according to the present invention.

Figure 9:
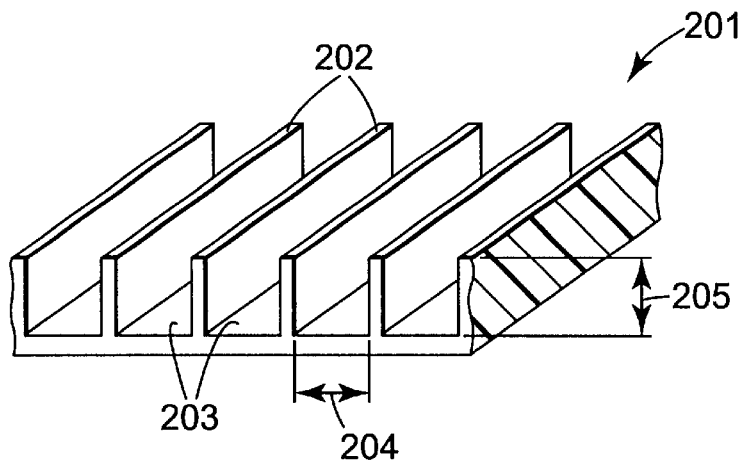

FIG. 9 illustrates a perspective view of another embodiment of a substrate which is useful according to the present invention.

Figure 10:
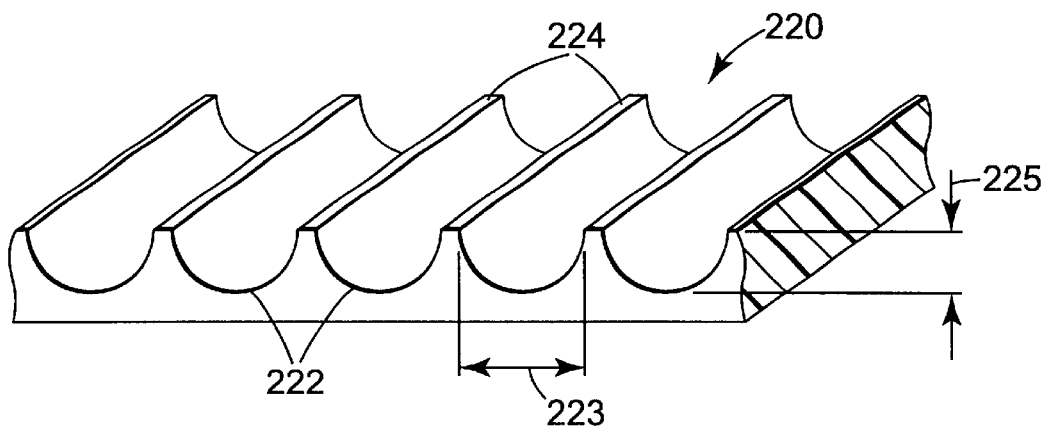

FIG. 10 illustrates a perspective view of another embodiment of a substrate which is useful according to the present invention.

Figure 11:
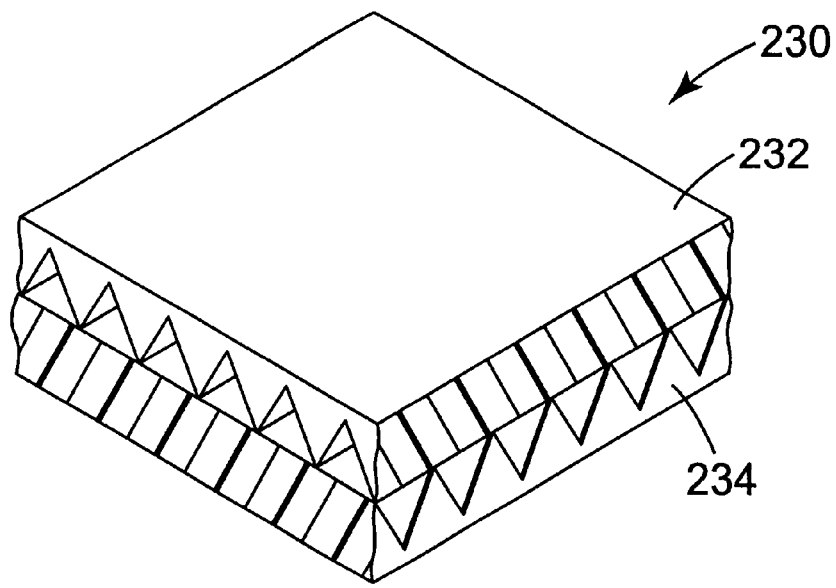

FIG. 11 illustrates a perspective view of another embodiment of a substrate which is useful according to the present invention.

Figure 12A:
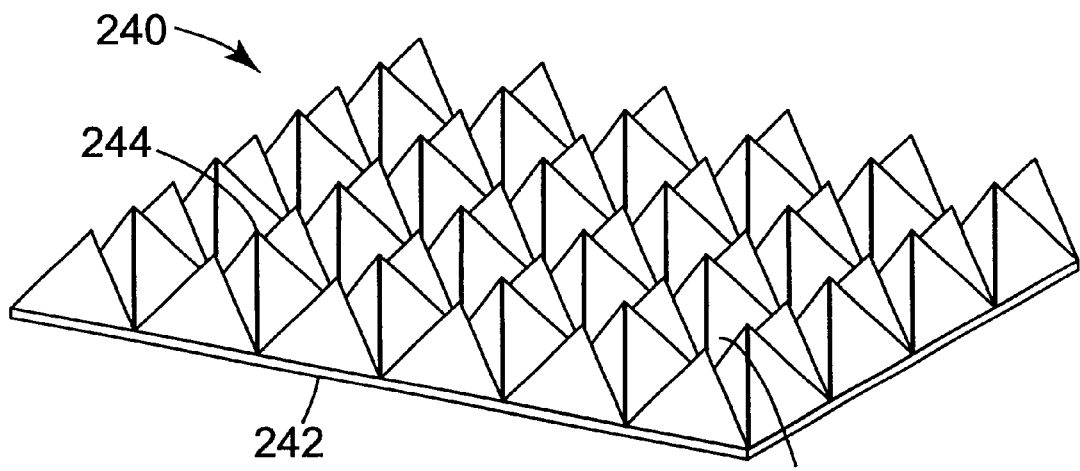

FIG. 12a illustrates a perspective view of another embodiment of a substrate which is useful according to the present invention.

Figure 12B:
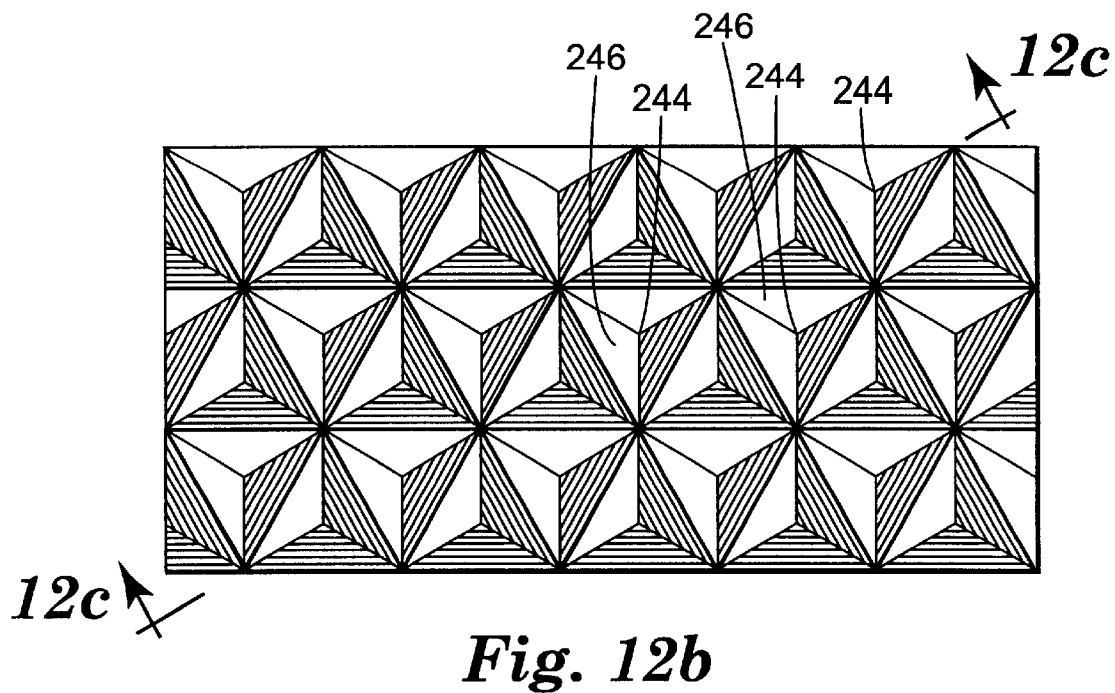

FIG. 12b illustrates a top plan view of the substrate of FIG. 12a.

Figure 12C:
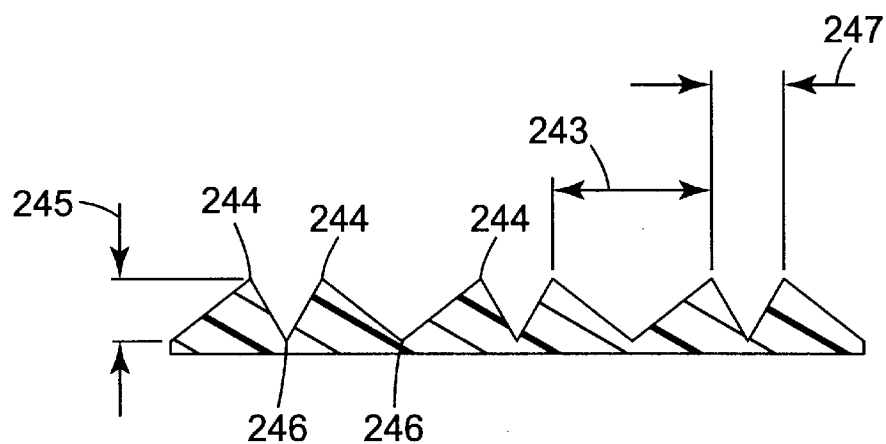

FIG. 12c illustrates a cross-sectional view of the substrate of FIG. 12b taken along line 12c—12c.

FIG. 13a is a top view of an article of the invention which is a game piece, prior to activation.

FIG. 13b is a top view of the article of FIG. 13a subsequent to activation.

FIG. 14a is a top view of an article of the invention which is a time temperature indicator, prior to activation.

FIG. 14b is a top view of the article of FIG. 14a subsequent to activation.

FIG. 15a is a top view of an article of the invention which is a furnace filter reminder.

FIG. 15b is a top view of the article of FIG. 15a subsequent to activation.

FIG. 16 is an exploded perspective view of an alternate embodiment of a timer article of the invention.

FIG. 17a is a top view of an alternate embodiment of an article of the invention which is a birth announcement, prior to activation.

Figure 18A:
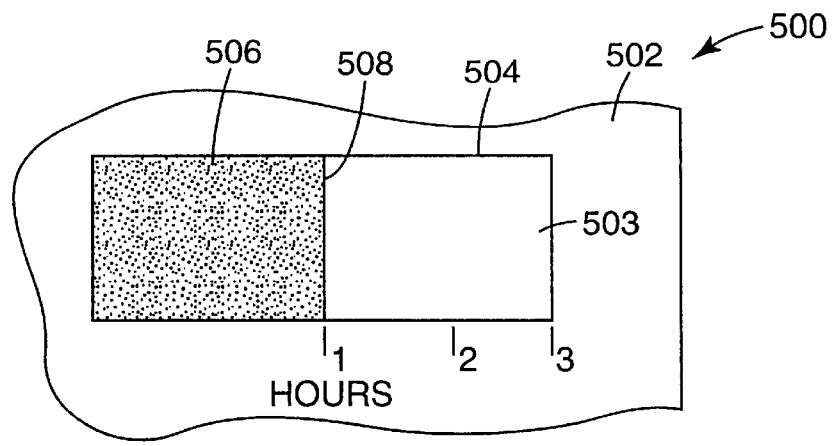

FIG. 18a shows a top view of a portion of an embodiment of an article of the invention subsequent to activation.

Figure 18B:
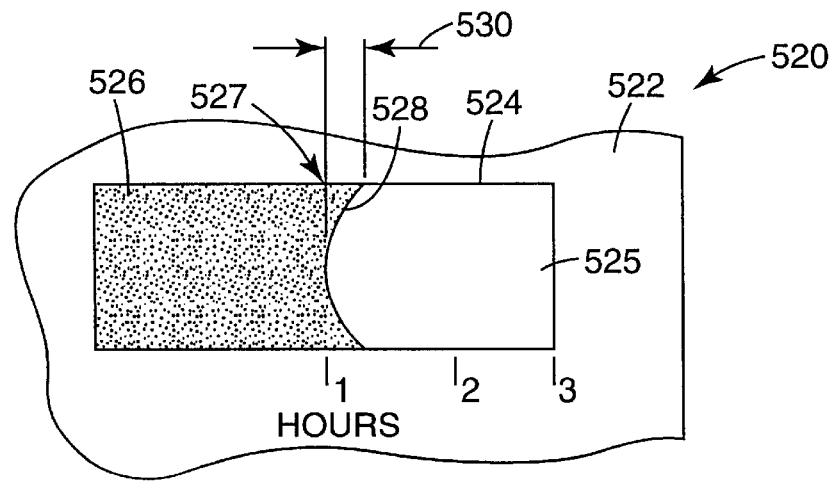

FIG. 18b shows a top view of a portion of an embodiment of an article of the invention subsequent to activation.

Figure 18C:
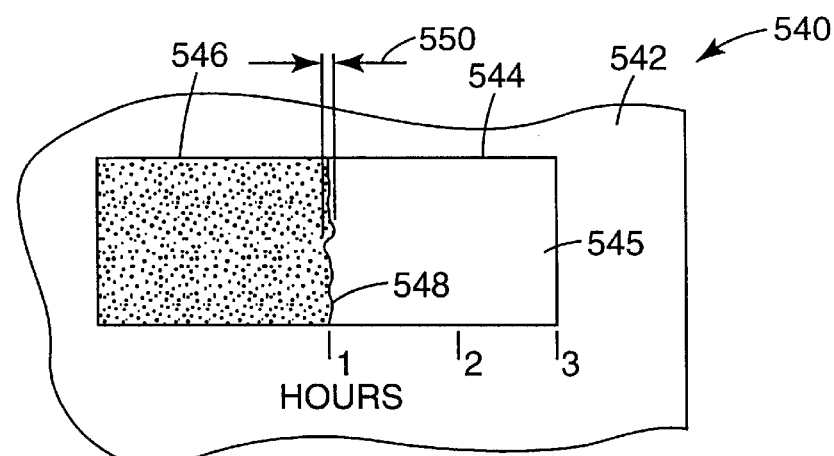

FIG. 18c shows a top view of a portion of an embodiment of an article of the invention subsequent to activation.

Figure 19A:
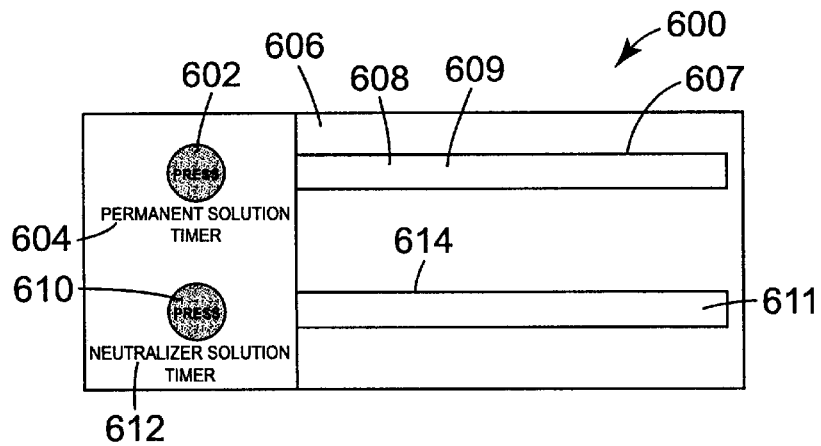

FIG. 19a shows a top view of another embodiment of an article of the invention prior to activation.

Figure 19B:
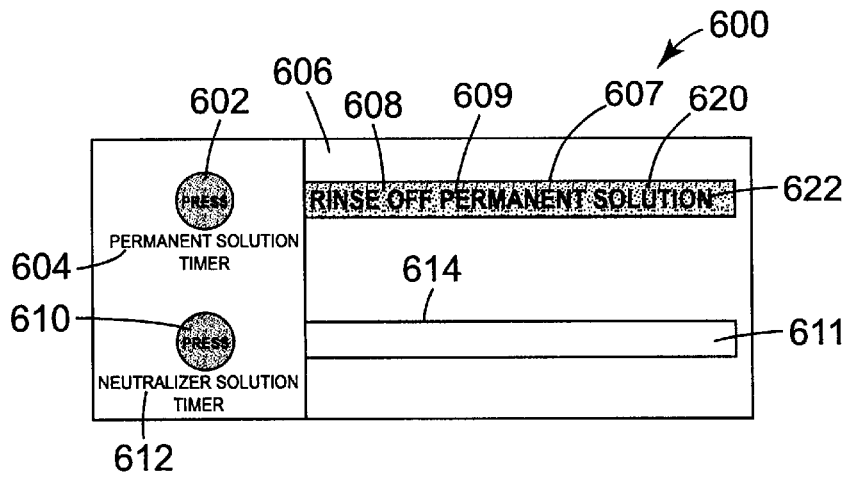

FIG. 19b shows the article of FIG. 19a after one of the timers has been activated.

Figure 19C:
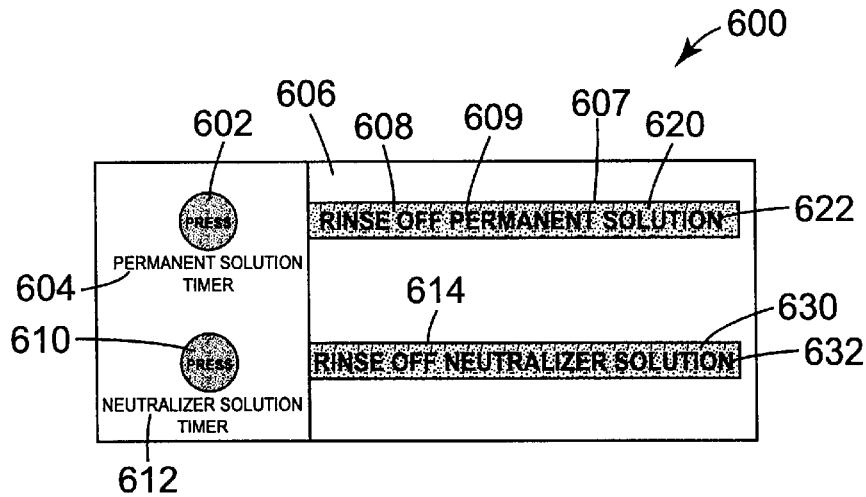

FIG. 19c shows the article of FIG. 19b after both of the timers have been activated.

Figure 20A:
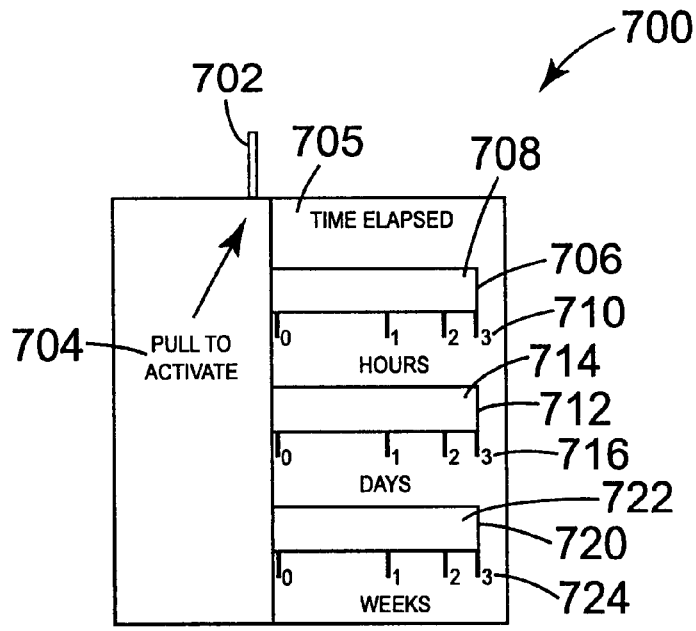

FIG. 20a shows a top view of another embodiment of an article of the invention prior to activation.

Figure 20B:
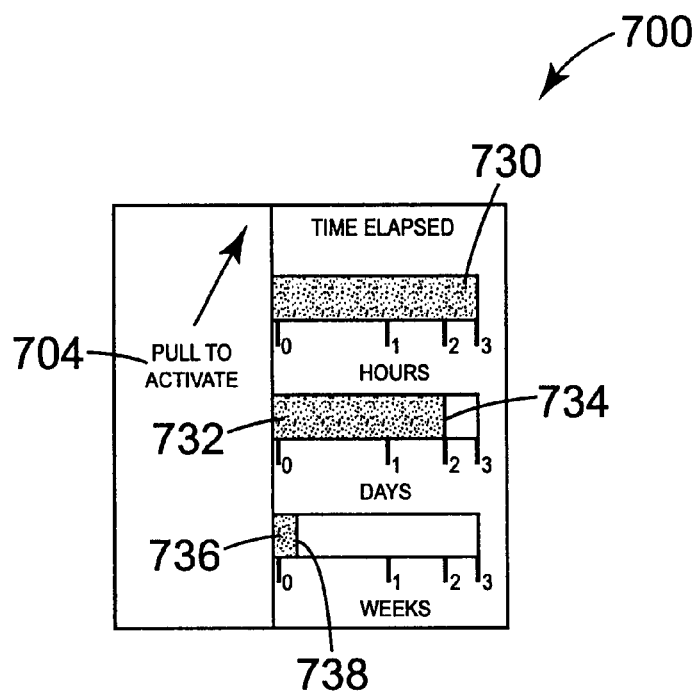

FIG. 20b shows a top view of the article of FIG. 20a subsequent to activation.

Figure 21A:
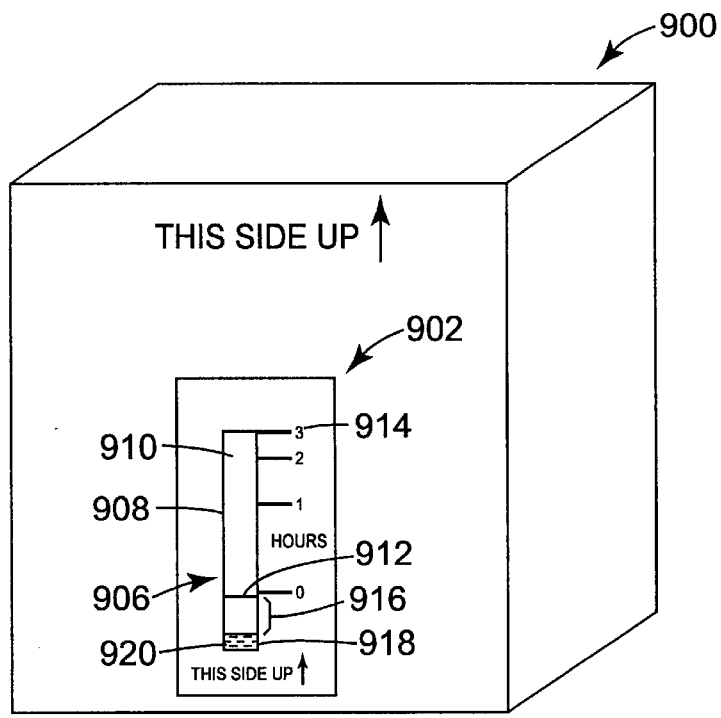

FIG. 21a shows a perspective view of another embodiment of an article of the invention attached to a box.

Figure 21B:
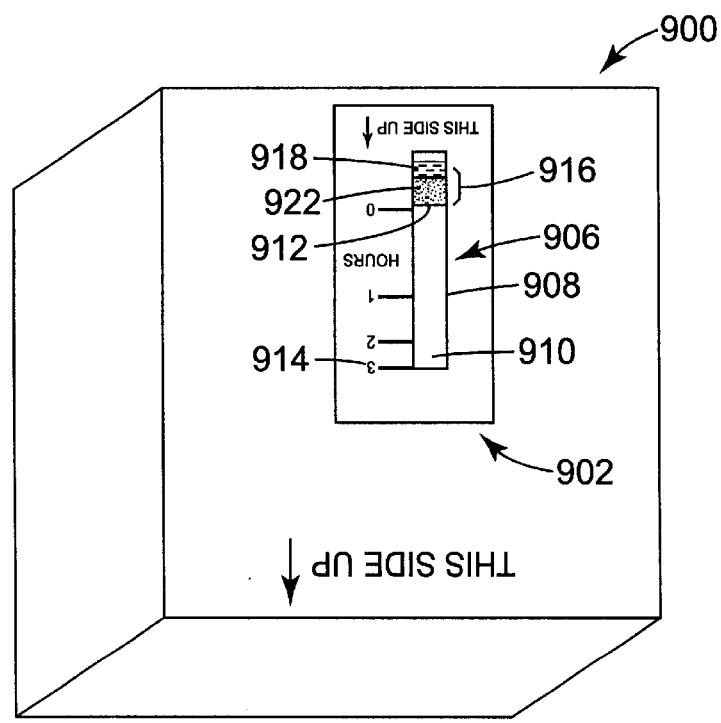

FIG. 21b shows a perspective of the article and box of FIG. 21a wherein the article has been activated by inversion.

FIG. 22a shows a cross-sectional view of another embodiment of an article of the invention.

FIG. 22b shows a top view of the article of FIG. 22a subsequent to activation.

FIG. 22c shows a partial cross-sectional view of the article of FIG. 22a subsequent to activation.

Figures 23A, 23B:
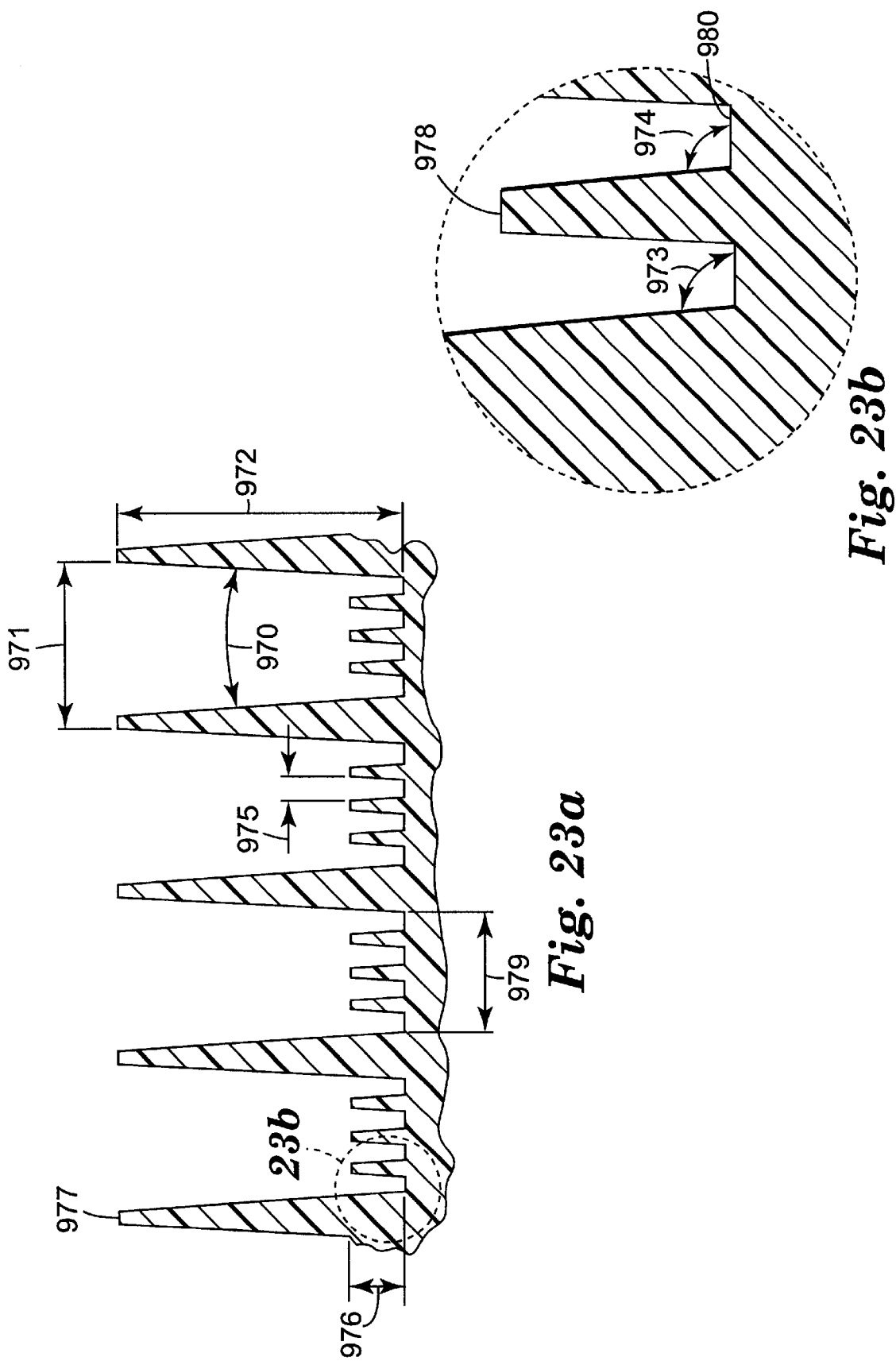

FIG. 23a is a cross-sectional view of a substrate useful in the articles of the invention.

FIG. 23b is an enlarged partial view of the substrate of FIG. 23a.

DETAILED DESCRIPTION OF THE INVENTION

Substrates

The substrates useful according to the invention are "substrates having a microstructured surface, wherein the microstructured surface defines a plurality of channels." Such a substrate has a predetermined channel pattern wherein the maximum depth and width of the channels is less than about 1000 microns. The channels may or may not be interconnected. The channels may optionally be formed from a series of projections. The definition is meant to exclude webs, fabrics, porous materials, porous papers, porous membranes, etc. which may have channels but which channels are not predetermined. Preferably the channel portion of the substrates of the invention are regular, orderly, and non-random. Preferably the channels are in an array. In some embodiments each channel would be substantially identical or identical to an adjacent channel. In some embodiments one may wish to have differing channel geometries and/or sizes either widthwise across the channel surface or lengthwise down the channeled surface.

The substrates useful according to the invention are typically flexible. Articles with flexible substrates may be easier to attach to an intended surface. However, semi-rigid and rigid substrates also may be useful according to the invention. Likewise, the articles of the invention are typically flexible. However, the articles of the invention may also be semi-rigid or rigid.

The substrate may or may not be retroreflective depending upon the particular embodiment. Examples of useful non-retroreflective substrates include but are not limited to microstructured substrates having a series of channels therein such as in FIGS. 8–10 wherein the channels are linear, parallel, and closely spaced.

The use of a retroreflective microstructured substrate may provide a number of advantages to the articles of the invention. These include the preferably highly visible fluid flow front with the use of the retroreflective substrate when the article is designed to be used in such a manner in which the fluid frustrates total internal reflection in the retroreflective substrate.

It is preferable that the substrate and/or other materials used in the articles not absorb the fluid so as not to interfere with the fluid flow (i.e. the substrate and other components of the article with which the fluid may come in contact with should preferably be essentially fluid impermeable, most preferably fluid impermeable.) Preferably the substrate and/or other materials used in the article with which the fluid may come into contact with (such as the cover, for example) are essentially non-absorbent, most preferably non-absorbent with respect to the fluid with which they are used.

Preferably also the fluid flow is only through the channels of the substrate and there is essentially no diffusion, most preferably no diffusion of the fluid into the substrate itself (or any other components of the article with which the fluid may come into contact).

Thus, the liquid most preferably does not become absorbed, diffuse into, or permeate the substrate itself or other components of the article it may come into contact with.

The flow of the fluid through the substrate is preferably via passive flow. That is it should preferably be through capillary action and optionally gravitational effects, although preferably any gravitational effects are minimal or nonexistent. The flow of the fluid should preferably not be "active", that is caused by devices such as pumps, external vacuum sources, etc.

The substrate can have a number of different shapes. The substrate may be symmetrical or asymmetrical. The substrate may, for example, have a shape selected from the group consisting of rectangular, square, trapezoidal, ring, triangular, etc., shapes. A rectangular shape can be useful since it is easy to cut and it is easy to design an article having a rectangular shaped substrate. However, the fluid flow rate decreases as the fluid progresses through the rectangular substrate. If time markings are desired on an article having a rectangular substrate (or any substrate for that matter in which the fluid flow rate decreases with time), typically they should not be evenly spaced due to the decreasing fluid flow rate. In such a case the markings would typically be positioned closer together nearer the end of the fluid flow path. (See FIGS. 1a and 3a, for example.) In order to avoid this decrease in fluid flow rate and to have more evenly spaced time markings one can potentially design the substrate such that its channels narrow near the end of the fluid flow path.

If the substrate shape is that of a rectangle, square, trapezoid, triangle, etc. the fluid would typically be positioned in a manner such that upon activation the fluid would contact an edge or end of the substrate at a location where channel openings or inlets are present. Although it is not required, typically channel openings are at located on at least one edge or side of a substrate and the channels extend through the entire substrate surface to another end or edge of the substrate (typically an opposite end or edge). When the substrate selected is rectangular in shape the components are typically positioned such that the flow path of the fluid corresponds with the longest side of the rectangle. If the substrate is ring shaped one may wish, for example, to position the fluid and a barrier in the center of the ring-shaped substrate such that once the barrier is removed the fluid flows radially from the inner ring perimeter towards the outer ring perimeter.

However, it may be possible to design an article in a manner such that the fluid contacts the substrate away from an end or edge (more towards the center, for example) as long as sufficient fluid contacts the channels so that it can flow through the channels in a manner in which an observer can determine the progress of the fluid therethrough.

As discussed previously the substrate of the article contains channels therein. Optionally the channels are interconnected. Preferably the channels are interconnected for a more even fluid flow front. The channels are typically provided on an exposed surface of the substrate. However, it may be possible to provide the channels internal to the substrate by joining together two microstructured surfaces to provide the desired types of channels for the fluid to flow through. (See FIG. 11, for example.)

A substrate having internal channels can potentially be prepared by joining together two sheets, each sheet having a pattern on one side thereof. The resultant substrate may or may not be retroreflective depending on the patterns joined together. The sheets can be joined together such that the patterned sides are join to form a channel system through which the fluid can flow typically via capillary action. These sheets can be held together by a variety of means such as by a clamp, a cover, an adhesive, hot-melt bonding, etc.

Depending on the substrate shape and channel design it may be that a small amount of fluid could leak out of the substrate sides (or edges) as it moves along the fluid flow path. Such fluid, which leaks out, could potentially reenter the substrate channels further along the fluid flow path contributing to a somewhat less than even fluid flow front. Thus in some cases it is preferred to seal the edges or sides of the substrate as long as the edge or area which allows fluid entry is unsealed and the edge or area toward which the fluid flows is unsealed to ensure a more uniform fluid flow front.

In an alternative and preferred embodiment of the substrate, an outer surface of the substrate contains the channels therein. An opposing outer surface of the substrate may optionally also contain channels. It is preferable, but not required, that the opposing outer surface be free of channels. It is typically expensive to provide a pattern on a substrate surface and it would not be cost effective to have channels on both surfaces when it is not necessary that both sides contain channels. Preferably in such an embodiment the opposing outer surface of the substrate is flat and free of channels and bonded to a cover in such a manner as to avoid fluid flow between the cover and the smooth side of the substrate. However, as mentioned previously the article should be constructed such that upon activation the fluid contacts the surface of the substrate that has channels therein in a manner that the fluid can flow within the channels. It is preferable that fluid flow along only one microstructed surface of the substrate so as not to provide multiple fluid flow fronts which could be confusing to an observer. However, there may be situations for a particular article wherein multiple fluid flow fronts on the same substrate may be desirable.

The channels of the microstructured substrate can have a variety of shapes. Typically the channels within the substrate are similarly shaped. Examples of useful channel cross-sectional shapes include but are not limited to the following: v-shaped channels, u-shaped channels, semi-circle-shaped channels, and square unshaped channels. The channels when viewed from above can be linear or non-linear. For example, they may be straight, curved, twisted, crooked, tortuous, etc. The channels may optionally be formed by a series of geometric projections, wherein the paths between the projections become the channels. This would be the case for retroreflective cube-corner sheeting discussed later herein. Preferably the channels of the substrate are planar.

Typically the depth of the channels range from about 5 to less than about 1000 microns, more typically about 10 to about 500 microns, preferably about 25 to about 200 microns, and most preferably about 25 to about 100 microns. Typically the width of the channels range from about 5 to about less than about 1000 microns, more typically about 10 to about 500 microns, preferably about 25 to about 250 microns.

Typically the spacing of the channels is such that a channel is within about 5 to less than about 1000 microns of another channel, more typically about 10 to about 500 microns, and preferably about 10 to about 250 nucrons.

The shape, length, and number of channels on the substrate can vary depending on a number of factors. These include, for example, the length of time one desires for the fluid to run through the substrate, the fluid to be used with the substrate and the level to which the fluid flow should or should not be influenced by forces other than capillary forces (such as gravity). To design an article substantially unaffected by gravity one should preferably utilize a substrate with sufficiently small channels.

The substrates useful according to the invention are microstructured. A variety of different classes and types of retroreflective and non-retroreflective channel-containing microstructured substrates are useful in embodiments of the invention. Preferably, the microstructured substrate retains its geometry and surface characteristics upon exposure to the fluids used in the article of the invention.

Examples of useful nonretroreflective substrates include but are not limited to those disclosed in U.S. Pat. No. 5,728,446 (Johnston) and U.S. Pat. No. 5,514,120 (Johnston), both incorporated by reference herein. These substrates provide for liquid management films that facilitate desired rapid and uniform anisotropic or directionally dependent distribution of liquids and absorbent articles using these films. These liquid management films have at least one microstructured surface with a plurality of primary grooves to promote the unidirectional spreading of the liquids. These primary grooves may also contain secondary grooves as in U.S. Pat. No. 5,728,446. However, these additional secondary grooves are less preferred for use in the current invention as they could contribute to a less even fluid flow front.

The microstructured flow channels of non-retroreflective microstructured substrates are in some embodiments substantially parallel and linear over at least a portion of their length. In all substrate embodiments, however, the channels are preferably interconnected. The channels can be easily formed from thermoplastic materials by casting, profile extrusion or embossing, preferably by casting or embossing.

The non-retroreflective microstructured substrates are preferably formed from any thermoplastic materials suitable for casting, profile extrusion, or embossing including, for example, polyolefins, polyesters, polyamides, poly(vinyl chloride), polymethyl methacrylate, polycarbonate, nylon, etc. Polyolefins are preferred, particularly polyethylene or polypropylene, blends and/or copolymers thereof, and copolymers of propylene and/or ethylene with minor proportions of other monomers, such as ethylene/vinyl acetate. Polyolefins are preferred because of their excellent physical properties, ease of processing, and typically lower cost than other thermoplastic materials having similar characteristics. Polyolefins readily replicate the surface of a casting or embossing roll and are also readily profile extruded. They are tough, durable and hold their shape well, thus making such films easy to handle after the casting or embossing process. Alternatively, the microstructured substrate can be cast from curable resin materials such as acrylates or epoxies, and cured by exposure to heat or ultraviolet (UV) or E-beam radiation. Most likely the microstructured substrates having retroreflective and/or other optical properties discussed in greater detail below can also be made by the procedures described above.

Another class of microstructured substrates useful in embodiments of this invention are retroreflective substrates. Retroreflective materials have the property of redirecting light incident on the material back towards its originating source. In situations where the retroreflective sheeting may need to flex or conform to a surface a sheeting is preferably selected which does so without sacrificing retroreflective performance.

There are two common types of retroreflective sheeting: microsphere-based sheeting and cube-corner sheeting. Microsphere-based sheeting, sometimes referred to as "beaded" sheeting, is well known in the art and employs a multitude of microspheres, typically at least partially embedded in a binder layer and having associated specular or diffuse reflecting materials (e.g., pigment particles, metal flakes or vapor coats, etc.) to retroreflect incident light. Illustrative examples of such retroreflectors are disclosed in U.S. Pat. No. 3,190,178 (McKenzie), U.S. Pat. No. 4,025,159 (McGrath), and U.S. Pat. No. 5,066,098 (Kult). Microsphere based sheeting does not have a regular predetermined channel pattern and is not considered to be "a substrate, the substrate having a microstructured surface, wherein the microstructured surface defines a plurality of channels" as that term is used herein.

Basic cube-corner retroreflective sheeting is well-known to those of ordinary skill in the retroreflective arts and falls within the definition of "a substrate, the substrate having a microstructured surface, wherein the microstructured surface defines a plurality of channels" as used herein. Such sheetings are frequently used on road signs, safety garments and the like. The sheeting comprises a substantially planar base surface and a structured surface comprising a plurality of cube-corner elements opposite the base surface. Each cube-corner element comprises three mutually substantially perpendicular optical faces that intersect at a single reference point, or apex. Light incident on the planar base surface of the sheeting is refracted at the base surface of the sheeting, transmitted through the sheeting, reflected from each of the of the three perpendicular cube-corner optical faces, and redirected toward the light source. The symmetry axis, also called the optical axis, is the axis that extends through the cube-corner apex and forms an equal angle with the three optical surfaces of the cube-corner element. Cube-corner elements typically exhibit the highest optical efficiency in response to light incident on the base of the element roughly along the optical axis. The amount of light retroreflected by a cube-corner retroreflector drops as the incidence angle deviates significantly from the optical axis.

Manufacturers of retroreflective sheeting design retroreflective sheeting to exhibit its peak performance in response to light incident on the sheeting at a specific angle of incidence. The term "entrance angle" is used to denote the angle of incidence, measured from an axis normal to the base surface of the sheeting, of light incident on the sheeting. See, e.g. ASTM Designation: E 808-93b, Standard Practice for Describing Retroreflection, incorporated by reference herein. Retroreflective sheeting for signing applications is typically designed to exhibit its optimal optical efficiency at relatively low entrance angles (e.g. approximately normal to the base surface of the sheeting). See, e.g. U.S. Pat. No. 4,588,258 to Hoopman, incorporated by reference herein. Other applications such as, for example, pavement marking or barrier marking applications, require retroreflective sheeting designed to exhibit its maximum optical efficiency at relatively high entrance angles. For example, U.S. Pat. No. 4,349,598 to White ('598 patent), incorporated by reference herein, discloses a retroreflective sheeting design wherein the cube-corner elements comprise two mutually perpendicular rectangular faces disposed at 45 degrees to the cube-corner sheeting base and two parallel triangular faces perpendicular to the rectangular faces to form two optically opposing cube-corner elements. U.S. Pat. No. 4,895,428 to Nelson, et al. ('428 patent) and U.S. Pat. No. 4,938,563 to Nelson, et al. ('563 patent), both incorporated by reference herein, disclose a retroreflective sheeting wherein the cube-corner elements comprise two nearly perpendicular tetragonal faces and a triangular face nearly perpendicular to the tetragonal faces to form a cube-corner. The cube-corner elements further include a non-perpendicular triangular face. All of the aforementioned cube-corner sheetings would be expected to be useful in the articles of the present invention The manufacture of retroreflective cube-corner element arrays is typically accomplished using molds made by different techniques, including those the techniques known as pin bundling and direct machining. Molds manufactured using pin bundling are made by assembling together individual pins which each have an end portion shaped with features of a cube-corner retroreflective element. U.S. Pat. No. 3,632,695 (Howell) and U.S. Pat. No. 3,926,402 (Heenan et al.), both incorporated by reference herein, disclose illustrative examples of pin bundling. The direct machining technique, also known generally as ruling, comprises cutting away portions of a substrate to create a pattern of grooves that intersect to form structures including cube-corner elements. The grooved substrate is typically used as a master mold from which a series of impressions, i.e., replicas, may be formed. In some instances, the master itself may be useful as a retroreflective article. More commonly, however retroreflective sheeting or retroreflective articles are formed in a polymeric substrate using the master mold or using replicas of the master mold.

Direct machining techniques are a useful method for manufacturing master molds for small microcube arrays. Small microcube arrays are particularly beneficial for producing thin retroreflective sheeting that has improved flexibility. Microcube arrays are also more conducive to continuous manufacturing processes. The process of manufacturing large arrays of cube-corners is also relatively easier using direct machining methods rather than pin bundling or other techniques. An illustrative example of direct machining is disclosed in U.S. Pat. No. 4,588,258 (Hoopman), incorporated by reference herein.

Master molds suitable for use in forming cube-corner sheeting in accordance with the '598 patent, the '428 patent, and the '563 patent may be formed using direct machining techniques as described above. However, the cube-corner geometries disclosed in the these patents require two different machining tools to produce a master mold. This reduces the efficiency of the master mold manufacturing process. Additionally, master molds manufactured according to these patents comprise surfaces that extend substantially perpendicular to the base surface of the master mold. Such perpendicular surfaces can be detrimental to the process of producing exact replicas of the master mold.

It is believed that all cube-corner sheetings discussed in the aforementioned patents would be useful in the articles of the present invention. Other microstructured retroreflective susbstrates which have projections other than cube-corners would also be useful in the articles of the invention The substrates useful according to the invention may optionally have one or more of the following optical characteristics: retroreflectivity, total internal reflection, and partial internal reflection. These include refractive and/or diffractive properties, for example. The microstructured substrate itself can have specular or diffusive properties, to improve the detectability of the fluid as it moves in the microstructured substrate. As the fluid moves in the microstructured substrate it wets the microstructured surface, causing the refractive index difference between the microstructured surface and adjacent fluid to decrease (compared to air), resulting in the frustration of the optical characteristics of the microstructured substrate and improving its transparency.

Fluids

A variety of fluids are useful according to the present invention. Examples thereof include but are not limited to those selected from the group consisting of viscous fluids, viscoelastic fluids, and mixtures thereof.

The surface tension of the fluid can vary. Typically the surface tension of the fluid at 23° C. ranges from about $10 \times 10^{-3}$ N/m to about $80 \times 10^{-3}$ N/m, preferably about $10 \times 10^{-3}$ N/m to about $60 \times 10^{-3}$ Nm, even more preferably about $10 \times 10^{-3}$ N/m to about $50 \times 10^{-3}$ N/m, and most preferably about $10 \times 10^{-3}$ N/m to about $40 \times 10^{-3}$ N/m.

The density of the fluid can vary. Typically the density of the fluid at 23° C. ranges from about 0.5 to about 2 grams/cc, preferably about 0.5 to about 1.5 grams/cc, and most preferably about 0.8 to about 1.5 grams/cc.

The zero rate shear viscosity of the fluid can vary. Typically the zero rate shear viscosity of the fluid at 23° C. ranges from about $1 \times 10^{-3}$ to about $1 \times 10^6$ Pa-s, preferably about 0.1 to about $1 \times 10^5$ Pa-s, and most preferably about I to about 10,000 Pa-s.

For time/temperature indicator articles of the invention the fluid selected is preferably temperature sensitive. For timer articles of the invention the fluid selected is preferably substantially temperature insensitive, most preferably temperature insensitive. Temperature sensitive fluids are defined as having an activation energy $E_a$ of 3 kcal/mole or more and a $Q_{10}$ of preferably greater than 1.1. Temperature insensitive fluids are defined as having an $E_a$ of less than 3 kcal/mole and preferably a $Q_{10}$ of 1.1 to 1.0.

The fluid selected for use in an article of the invention is preferably innocuous and non-reactive with the other components of the article with which it may come in contact. If the article is to be used in contact with food products it should meet all relevant laws and regulations for such a product. Examples of useful relatively innocuous and non-reactive fluids include but are not limited to the following: silicone fluids such as polydimethyl siloxane fluids, saturated hydrocarbon-based oils, silicone oils and gums, mineral oils, glycerols, water, and aqueous based fluids.

The fluid may or may not be colored depending on the embodiment employed. In an embodiment such as FIG. 1e, where the substrate is retroreflective (or in other applications where the substrate may have the optical characteristics discussed previously herein), the fluid is typically clear and colorless and as the fluid fills the channels it causes the total internal reflection to become frustrated (that is the substrate that appeared opaque now appears clear in those areas where the channels are filled, allowing a viewer to observe the colored cover layer below.) Preferably the fluid has an index of refraction within about 0.4 of the index of refraction of the microstructured substrate surface (preferably the entire microstructured substrate) more preferably substantially the same, and most preferably the same as the microstructured substrate (preferably the entire microstructured substrate). However, the exact nature of the fluid can vary as long as when it is used in an application wherein it is intended to render the substrate transparent it does so sufficiently so one can identify the fluid flow front, by for example, viewing any color and/or graphics beneath the substrate.

In the embodiment of FIG. 5b the substrate is not retroreflective. When the substrate is not retroreflective or when the substrate is retroreflective but one does not intend to use it in a manner that causes it to become transparent, the fluid typically contains pigment(s) and/or dye(s) (such as blue organic dye, for example) and the substrate is selected to provide a contrast to the fluid flow (such as a white opaque substrate, for example.)

The selection of the fluid and the substrate and the positioning thereof in the article should be sufficient to allow an observer to view the progress of the fluid over time as it migrates through the channels of the substrate.

Depending on the particular embodiment of the article of the invention an observer may find that the fluid is more readily visible by changing the viewing angle. One can readily manipulate the article or change one's position to find the preferred viewing angle.

Suitable fluids according to the present invention include, for example, viscoelastic and viscous fluids and combinations thereof that provide the desired properties for migration into the channels of the microstructured surface, in response to time and/or cumulative thermal exposure. For capillary action to primarily drive the migration of the fluid into the channels of the microstructured substrate, the surface energies of the article components should preferably cause the local contact angle of the fluid on the surface of the fluid on the microstuctured surface of the substrate to be less than about 90 degrees, more preferably less than about 25 degrees, within the range of intended use temperatures. The contact angle is a function of the surface energy of the microstructured surface, the surface energy of the fluid (e.g. liquid), and the interfacial energy between the two.

A viscous material can be defined by analogy to classic viscous fluids. If an external stress is applied to a viscous fluid, it will deform and continue to deform as long as the stress is present. Removal of the stress will not result in a return of the fluid to its undeformed state. Such a response is called viscous flow and defines a viscous material or fluid. When there is a direct proportionality between the stress and the rate of deformation in a viscous fluid, the fluid is a Newtonian fluid. There are also viscous fluids which are non-Newtonian and which exhibit a non-linear dependence between the stress and the rate of deformation.

Materials that exhibit both elastic and viscous properties simultaneously are called viscoelastic materials. Elastic properties can be explained with reference to classic elastic solids. Elastic solids respond to external stress by deforming, and upon removal of the stress, respond by returning to their original shape. Such a response is called elastic. Some elastic materials exhibit a direct proportionality between the stress and the deformation, thereby conforming to what is known as Hooke's Law. There are also elastic materials which do not obey Hooke's Law and which exhibit a non-linear relationship between stress and deformation. Viscoelastic materials are sometimes classified as either viscoelastic solids, i.e., elastic solids which exhibit some viscous effects during deformation, or viscoelastic liquids, i.e., viscous liquids which exhibit some elastic effects. A viscoelastic liquid can be identified as a viscoelastic material that continues to deform indefinitely when subjected to a shearing stress.

A viscoelastic material may exhibit a transition from an immobile, glassy state to a viscoelastic liquid state at a temperature known as the glass transition temperature, $T_g$. It may also exhibit a transition from a partially crystalline state to an amorphous state at the temperature at which the crystalline material melts, $T_m$. Often, such a material will behave as a viscoelastic solid below $T_m$. For a further discussion of the properties and analysis of viscoelastic materials, reference is made to John D. Ferry, *Viscoelastic Properties of Polymers,* (John Wiley & Sons, Inc. 1980), incorporated by reference herein.

Fluids selected for use in the articles of the invention should preferably have $T_g$s and $T_m$s below the temperatures at which the article of the invention is intended for use.

In a timer article of the present invention, when a viscoelastic material has been selected for use, it is preferred to use a viscoelastic liquid exhibiting small elastic effects, such that it behaves essentially as a viscous fluid in a liquid state at all anticipated temperatures to which the article of the invention will be exposed.

In the time-temperature indicator device of the present invention, the fluid is preferably in a liquid state (most preferably a viscoelastic liquid state) at all anticipated temperatures to which the object to be monitored and thus the article of the invention will be exposed. This can be accomplished by choosing a fluid which has all such thermal transitions at temperatures below the anticipated range of temperatures to which the object to be monitored and thus the article of the invention will be exposed. This allows for an indicator that will be in its activated state upon contacting the fluid with the microstructured channels of the substrate. This also allows the fluid to migrate into the channels throughout the entire anticipated temperature range. In this manner, the indicator will be able to provide continuous integration of time-temperature exposure over the entire range of temperatures to which the object to be monitored and thus the article of the invention is to be exposed. It is also preferable that the fluid be able to migrate into the channels, at any temperature at which appreciable degradation or other change can occur in the product being monitored.

Although viscoelastic liquid materials are preferred in the present invention, it is possible for some viscoelastic solid materials to function provided the modulus of the material is low enough for it to deform and penetrate entirely through the microstructured channels under the influence of capillary action or other driving forces present in the device. (These solids which can function as fluids by flowing within the channel substrates are considered to fall within the definition of "fluid" as used herein.)

A solid (such as a viscoelastic solid, for example) with a crystalline or glassy continuous phase would not perceptively migrate into the channels, or if it did, it would be at such a slow rate as to not be practical for providing a visual indication of cumulative thermal exposure. However, at temperatures above the crystalline melting point of the glass transition temperature of the material, it would become a fluid and capable of migrating in the channels. Such materials are desirable for certain types of temperature monitoring applications, especially those in which the product undergoes degradation only above a critical threshold temperature.

An illustrative, but by no means exclusive, list of viscoelastic and viscous materials which may be suitable for use in the articles of the present invention includes natural rubber, butyl rubber, polybutadiene and its copolymers with acrylonitrile and styrene, polyalpha-olefins such as polyhexene, polyoctene, and copolymers of these and others, polyacrylates, polychloroprene, polydimethylsiloxane, silicone oils and gums, mineral oils, and block copolymers such as styrene-isoprene block copolymers, and mixtures of any of the above. Materials which undergo a melting or glass transition to change from solid to liquid behavior which could be useful in the present invention include hydrocarbon waxes, elastomer/tackifier blends, etc.

The viscoelastic materials may for example comprise elastomers conventionally formulated as pressure sensitive adhesives. Examples thereof include but are not limited to polyisoprene, atactic polypropylene, polybutadiene, polyisobutylene, silicone, ethylene vinyl acetate, and acrylate based elastomers, and can typically include a tackifying agent and/or a pasticizing agent.

Monomers useful in making fluids useful in the articles of the invention include but are not limited to those which have a homopolymer glass transition temperature less than about 0° C. Useful alkyl acrylates include but are not limited to unsaturated monofunctional (meth)acrylic acid esters of non-tertiary alkyl alcohols having from 2 to 20 carbon atoms in the alkyl moiety, and preferably from 4 to 18 carbon atoms, and more preferably, from 4 to 12 carbon atoms. Examples of useful alkyl acrylate monomers include, but are not limited to, n-butyl acrylate, hexyl acrylate, octyl acrylate,. isooctyl acrylate, 2-ethylhexyl acrylate, isononyl acrylate, decyl acrylate, dodecyl acrylate, lauryl acrylate, octadecyl acrylate, and mixtures thereof.

An example of an optional reinforcing co-monomer is a monoethylenically unsaturated monomer having a homopolymer glass transition temperature greater than about 25° C. and is preferably co-polymerized with the acrylate monomers. Examples of useful co-polymerizable monomers include, but are not limited to, meth(acrylic) acid, N-vinyl pyrrolidone, N-vinyl caprolactam, substituted (meth)acrylamides, such as N,N,-dimethyl acrylamides, acrylonitrile, isobornyl acrylate, and mixtures thereof. When a co-polymerizable monomer is used, the alkyl acrylate is typically present in the composition in amounts from about 50 to 99 parts by weight and the co-polymerizable monomer is typically present in corresponding mounts from 50 to 1 parts by weight wherein the total amount by weight is 100.

The elastomer can optionally include a tackifier and/or plasticizer in a tackifier to elastomer base weight ratio or a plasticizer to elastomer base weight ratio of typically up to about 2:1. Suitable tackifiers include, but are not limited to, hydrogenated rosin esters commercially available as Foral 85™, Foral 105™, or Abitol™E, and hydrocarbon tackifiers such as Regalrez™, all available from Hercules Incorporated of Wilmington, Del. Suitable plasticizers include but are not limited to hydrocarbon oils such as Shellflex™ (available from Shell Chemical Co., Houston, Tex.), USP grade mineral oil, and phthalates including alkyl phthalates such as dioctyl phthalate and diisononyl phthalate, and allyl phthalates.

The article of the invention is preferably designed to provide sufficient fluid to fill the channels of the microstructured surface as the fluid migrates along the channels.

The article components should also preferably be chosen to provide a desired rate of migration of the fluid into the channel structure of the microstructured substrate. In a time indicator the fluid such as a viscous liquid, for example, should preferably migrate through this channel structure at a rate that is essentially independent of temperature. By controlling the properties of the liquid, the indicating device can be constructed to provide a visually observable indication of the time expired. Accordingly, it is desirable to be able to select a liquid having suitable characteristics for the amount of time that needs to be monitored.

In a time-temperature indicator the fluid, such as a viscoelastic liquid for example, preferably migrate throughs the channel structure at a rate which preferably increases with temperature in a sufficiently similar way to the change in decay rate of the object to be monitored to provide a suitable time-temperature indicator. By selecting a fluid with the appropriate properties, the indicating device can be constructed to provide a visually observable indication of a predetermined cumulative thermal exposure. It will often be useful to provide an indication of a predetermined allowable cumulative thermal exposure for a particular perishable item, such as food, medicine, photographic supplies, and vaccines. Accordingly, it is desirable to be able to select a fluid having suitable characteristics for the particular product to be monitored.

As discussed above, $Q_{10}$ and $E_a$ are useful as a quantification of rate of degradation or other rate of change of an object to be monitored. It is also useful to quantify the effective $E_a$ or $Q_{10}$ of the fluid so as to select a suitable fluid for the object to be monitored. As with the particular object to be monitored, it is possible to select various fluids and perform experiments on indicators comprising the fluids to determine the rate of change of the visually observable indication at various temperatures for each fluid. It is then possible to calculate a measured effective $E_a$ and/or $Q_{10}$ for various fluids with a given substrate to best fit the intended use of the indicator. It is also possible to measure the temperature dependence of the flow properties of the fluid independently and estimate the effective activation energy.

For example, one can measure the dynamic mechanical properties of a fluid as a function of frequency at various temperatures and perform time-temperature superposition according to the classical procedures as is known in the art of rheology. The temperature dependent shift factors which result can be fitted to the Williams-Landel-Ferry equation and then the effective activation energy can be calculated according to the well-known equation of Ferry. See John D. Ferry, *Viscoelastic Properties of Polymers,* (John Wiley and Sons, Inc, 1980), incorporated by reference herein. One skilled in the art of rheology would be able to use the equation of Ferry as described. Any of a number of other rheological properties could be measured such as creep compliance, dynamic viscosity, etc., and their temperature dependence used to estimate the effective activation energy by one skilled in the art of rheology.

Many fluids useful in the articles of the invention have an $E_a$ that varies somewhat with temperature. In that case, an average or effective $E_a$ over a temperature range can be calculated. Correspondingly, the $Q_{10}$ value of the fluid for a particular increase in temperature, for example from 20° C. to 30° C., would be expected to be somewhat different from the $Q_{10}$ value for an increase in temperature from 30° C. to 40° C. Nonetheless, the $E_a$ and $Q_{10}$ has been observed to vary with temperature by a small enough amount that the viscoelastic or viscous materials are still useful as an accurate integrator of temperature over time to provide an accurate indication of predetermined allowable thermal exposure. Furthermore, the $E_a$ becomes less sensitive to temperature change as temperatures increase above the $T_g$. An effective $E_a$ over a given temperature range can be calculated for each fluid. The fluid can then be chosen to provide an indication of a predetermined thermal exposure for a given object to be monitored. One skilled in the art of rheology can readily determine the $E_a$ or $Q_{10}$ for a particular fluid.

Another property of the indicator which has been observed to influence the suitability of the indicator for a particular application is the runout time. This is the period of time it takes for migration of the fluid to fill the channels of the microstuctured surface and provide the visually observable indication. This is the point at which the leading front (i.e. the fluid flow front) of the migrating fluid reaches a predetermined distance along the channels of the microstructured surface. The fluid selected, the characteristics of the channels formed by the microstructured surface and the length of these channels can affect the runout time of a particular indicator.

By selecting a fluid with the desired effective $E_a$ (or $Q_{10}$) and the fluid and microstructured substrate combination with the desired runout time, it is possible to provide an indication of cumulative thermal exposure for a particular perishable item. Similarly, it would also be possible to provide an indication of cumulative time for a process or task being monitored.

The following general observations have been made with respect to the fluids useful in the articles of the invention. Values of effective $E_a$ from about 3 kcal/mole to about 70 kcal/mole have been observed in the fluids described herein. Materials with an $E_a$ of about 3 kcal/mole or less are particularly suitable for time indicators may, for example, comprise formulated fluids primarily composed from polydimethylsiloxanes and similar silicone fluids. Materials with and $E_a$ larger than about 3 kcal/mole, are particularly suited for use in time-temperature indicators and encompass, for example, viscoelastic materials as discussed above. In such viscoelastic materials, it has been observed that the choice of elastomer is a primary factor in determining the effective $E_a$ for a particular viscoelastic material. For instance, 100% IOA isooctyl acrylate elastomers have an $E_a$ in the range of about 12–20 kcal/mole over the temperature range of 0 to 50° C.

Adding increasing amounts of tackifier generally raises the glass transition temperature and the effective $E_a$ of the elastomer. Adding plasticizer generally decreases the glass transition temperature and effective $E_a$ of the elastomer. By selecting particular viscoelastic materials, and by providing various amounts of tackifier and/or plasticizer, the migration characteristics of the viscoelastic material can be controlled. The fluid is preferably in its amorphous liquid state to at least below 50° C., more preferably below 20° C., still more preferably below 0° C., yet more preferably below −20° C., and most preferably to at least below −40° C. The fluids described herein typically have glass transition temperatures falling within a range of from about −130° C. to 10° C. Some of the fluids described herein remain useable to temperatures at least as high as 100° C, and it may be possible to formulate materials useful to temperatures as high as 200° C or higher.

Fluid Separation

The fluid should remain separated from the substrate until activation of the article is desired. To activate the article, a manipulation is typically performed on the indicator such that the fluid is allowed to contact at least some of the channels of the substrate. Prior to activation the article can be stored almost indefinitely. The fluid may be separated from the substrate, for example, by an actual physical barrier or by merely a space. The separation by merely space is useful for an article which may be a movement indicator which activates when the article is moved by lifting, tilting, and/or inverting, for example, thereby placing the fluid in contact with the substrate channels.

The use of an actual physical barrier is advantageous for articles which one wishes not to become activated merely by the position of the article and requires an actual step such as penetrating, rupturing or removal of the barrier for example, to allow fluid contact with the substrate. A number of fluid barriers may be used according to the invention. For example, the barrier could be a reservoir or container such as a pouch, sack or bladder in which the fluid is contained. Upon applying pressure to the pouch, sack or bladder it would rupture allowing contact of the fluid with the substrate. This pressure may be applied by finger pressure, for example. Other barriers include, for example, gates, valves, etc. These barriers could be manipulated or removed, for example, by pulling a tab, pulling a cord, removing a laminated seal, breaking a capsule, etc. to allow contact of the fluid with the substrate. Other fluid reservoirs and barrier systems and methods of activation would be useful in the articles of the invention.

The barrier could be made from a number of materials including but not limited to plastic, adhesives, metals, glass, etc.

When multiple substrates and/or multiple fluids are included in the article of the invention one may wish to use multiple barriers for the fluid(s). For example, each separate fluid may be contained by a separate barrier. Alternatively, portions of the same fluid may each be contained by a separate barrier.

If a solid is used which becomes a fluid upon exposure to heat it may be separated from the substrate by one of the barriers described above, for example. Alternatively one may not wish to separate the solid from the substrate by a barrier and instead may rely on maintaining an appropriate temperature until activation is desired to prevent the resultant fluid from contacting the substrate. Also the solid could be positioned such that instead of contacting the substrate immediately upon melting that it be separated from the substrate by a space and not contact the substrate until movement of the article occurs.

Covering

The article of the invention may optionally include a covering which covers a portion or all of the article. Such a covering would typically cover a portion or all of any fluid(s), any solid(s), any barrier(s) and the substrate(s). The covering would typically also cover any colored or ink layer(s) which is contained in the article and which is intended to gradually appear and disappear to a viewer as the fluid flow progresses. The covering of the article may be flexible, semi-rigid or rigid. The covering is preferably chosen such that it does not interfere with the activation of the article and the flow of the fluid(s) along the fluid flow path(s). The covering preferably should be selected to prevent fluid(s) from leaking from the article. The covering can be made from a variety of materials, including but not limited to polymeric materials such as plastics. The covering may be a one-piece construction or may be a multiple-piece construction, formed, for example, by two pieces of tape joined together. The cover could be made of an opaque material provided with a transparent window through which to view the fluid progress for example. Alternatively the cover may be made from a transparent material with graphics thereon. A portion of the transparent cover should preferably be left free from graphics to provide a window to view the fluid progression. Other cover configurations are also possible. The cover may be adhered to the substrate and other components of the article such as a fluid reservoir, for example, in a variety of ways including, for example, lamination of a pressure sensitive adhesive tape onto the substrate and the fluid reservoir such that the tape backing becomes the cover. Alternatively, a transfer pressure sensitive adhesive can be laminated to the substrate and a fluid reservoir, for example, and a cover laminated to the pressure sensitive adhesive.

Method of Monitoring Fluid Flow

One of the disadvantages of many presently known timers and time-temperature indicators is the effect known as "The Grey Time". Since many of these known indicators rely upon image appearance or color change rather than a fluid flow front to monitor the passage of time or the accumulated thermal history of the indicator, there is a period where the status of the indicator is subject to interpretation by the viewer. For example, for a known indicator that has an area to be monitored that relatively simultaneously changes in its entirety from white to black goes through a period where the indicator becomes increasingly grey. The point where the indicator moves from the grey state to the black state, even if a reference color chart is placed on the indicator, is subject to interpretation of the viewer and therefore lacks a sharp transition time. This phenomenon is also present to some degree in similarly designed known indicators where a hidden message appears or a readable message disappears, because all of these indicators are based upon diffusion. The present invention, however, uses a substrate with well defined channels that may be precisely and reproducibly made and therefore fluid flow through these channels is preferably accurate and reproducible.

The indication of the passage of time in the article of the current invention is provided by a fluid flow front. The readily detectable presence or absence of a fluid in the substrate channels minimizes "The Grey Time" phenomenon discussed above.

A number of different techniques can be used to monitor the progress of fluid flow in the articles of the present invention. In articles of the present invention the fluid flow may be monitored continuously during operation of the article (See FIGS. 1a–c, for example) or the fluid flow may be monitored at discrete and predetermined sections of the article through the use of small windows, slots or other similar types of viewing apertures (See FIGS. 2 and 14a–b, for example). For example, if an article is designed for use to indicate the passage of a given period of time only, a small window at the location on the substrate corresponding to the passage of that period of time may be all that is desired. In other instances, continuous monitoring of time or an indication of the time remaining until a milestone time is reached may be desirable. In that case several small windows or one larger window may be desirable for monitoring fluid flow.

If a substrate is not retroreflective or if the substrate is retroreflective but designed for use in a manner which does not frustrate total internal reflection, a fluid to be used therewith most likely would contain dyes, pigments, and/or other coloration agents. As the fluid flows through the channels the color-containing fluid front may be visually detected by contrast with, for example, a white substrate. (See For example, FIGS. 5a and 5b.)

If the substrate is retroreflective the progress of the fluid flow can optionally be monitored by observing the loss of total internal reflection in the retroreflective substrate as the fluid progresses through and fills the substrate channels. The presence of the fluid in the channels in close physical contact with the optical surface of the retroreflective substrate destroys the air interface necessary for total internal reflection to occur at the optical surface. As a consequence, as the fluid flows through the channels, filling the air interface necessary for the total internal reflection, the total internal reflection is frustrated and the otherwise opaque channel containing substrate becomes transparent. A backing behind the retroreflective substrate can be colored to enhance the contrast between the regions where total internal reflection has been frustrated and regions where total internal reflection is operating, or a message or messages including, for example, a bar coded message may be printed on the backing to be revealed as the fluid flow progresses and the total internal reflection is frustrated. (See for example, FIGS. 1e and 1f.) The concept of frustration of retroreflection is discussed in Whitehead U.S. Pat. No. 5,959,777 and Whitehead et al., U.S. Pat. No. 5,999, 307.

Preferably the fluid flow in an article of the invention can be viewed by an observer with an unaided eye (when the viewer has 20/20 vision or vision corrected to 20/20 vision).

Graphics

The article of the invention may optionally comprise a number of graphics. These may include, for example, an identification of what the article is and by whom the article is made, instructions on how to activate the article, scales to help show the progress of the flow of fluid(s) over time and thus the amount of time elapsed. The units on the scale may be indicative of seconds, minutes, hours, days, weeks, months or years, for example, depending on the length of time the article is designed to be used for. Alternatively the scale could include symbols indicative of the elapsed time such as a plus, zero and minus along the fluid flow path wherein a plus indicates much time remaining, zero represents a mid-point, and a minus indicates an end point.

These graphics would in some cases be applied to the covering of the article adjacent to the window(s) or even on the window(s) through which the fluid flow is viewed along the fluid flow path. In some articles wherein a substrate is retroreflective and the article functions by the frustration of total internal reflection with fluid flow, the inside cover of the backing beneath the substrate or the side of a substrate opposite the side having fluid flow therethrough could have a scale printed thereon. Alternatively a separate printed and/or graphics layers could be positioned on a side of a substrate opposite of the fluid flow but such that it becomes apparent to an observer with fluid flow. Optionally transparent layers such as an adhesive layer could be used to bond such a layer to the substrate. Alternatively, symbols, a scale, words (such as "expired", "end" "finished" "replace", and "remove" etc.), etc. could be printed on the inside of the backing which appear to a viewer as the fluid progresses along the channels of a retroreflective substrate. Other uses and positioning of color, ink and graphics are possible. Thus graphics may appear on the article such that they remain during fluid flow, only become apparent with fluid flow, and/or vanish with fluid flow.

In some embodiments one may wish to have printing on a non-structured surface of a substrate. For example, a v-shaped channel substrate which is clear and not retroreflective may have the words "fresh" printed on the substrate side opposite the channels. A colored fluid passing through the channels slowly obscures the word "fresh". When the word "fresh" is totally obscured one knows that the expiration period has been reached. In this case a structured substrate surface would typically be positioned closest to the window.

Uses

The articles of the invention can be used for a variety of purposes.

The timer, for example, has the following potential uses. It can be used on items that are subject to degradation over time such as food, beverages, pharmaceutical products such as vaccines, medicines, vitamins, etc. It can also be used on or in conjunction with items that need replaced on a regular basis as a reminder that sufficient time has elapsed such that a replacement should be made. These items include for example filters, such as furnace filters and water filters; automotive oil; cleaning sponges; etc. These articles can also be used to time activities such as meetings, "time-outs" for children, medical tests, etc. The articles can also be used as a reminder for taking medicine or changing bandages, etc. For example, a potential use of a timer article would be would be on a transdermal patch which is intended to release a drug, such as a painkiller for example, through the skin of a patient. The timer article could be used to indicate when the patch had expired and needed to be replaced. Care should be taken that such articles are adequately tested before being used for medical, health, and/or safety uses and that they comply with all relevant laws and regulations. The timers could also be used on or in conjunction with parking permits, admission tickets, and visitor identification badges which are to have a set expiration time or date; game pieces; lottery tickets; invitations; calendars; announcements; greeting cards; reminders to clean, toss contents, change batteries; etc. The article could potentially be attached to an article to be monitored such as a food item, carried by the user, or positioned elsewhere such as in a notebook, on a bulletin board, counter, car dashboard, etc.

Although game pieces, lottery tickets, invitations, announcements and greeting cards may not have a scale which marks time passage on them, they would be designed to elapse in a certain period of time. Typically it would be long enough to build suspense (seconds or minutes) but not so long that the user of the article becomes bored waiting for the full message.

The articles of the invention are particularly useful for items where it would not be appropriate or feasible to use conventional timing devices. These timer articles could be applied, for example, by a consumer to packages of leftover food in a refrigerator. Timer articles could also be applied, for example, by a manufacturer, to a packages of food that retain their freshness, for example, seven days upon opening. The consumer could then activate the article upon opening.

This invention will be better understood by referring to the following figures.

Figure 1A:
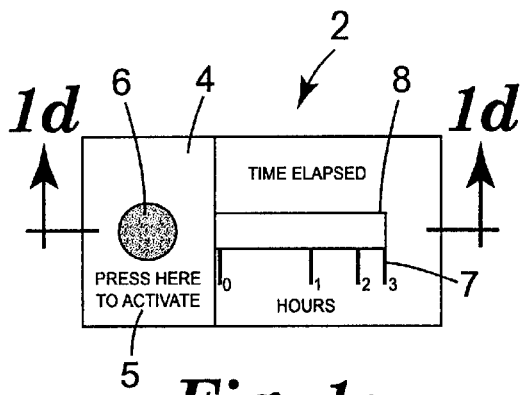
FIG. 1a illustrates a top view of an embodiment of a timer article of the invention prior to activation.
Figure 1B:
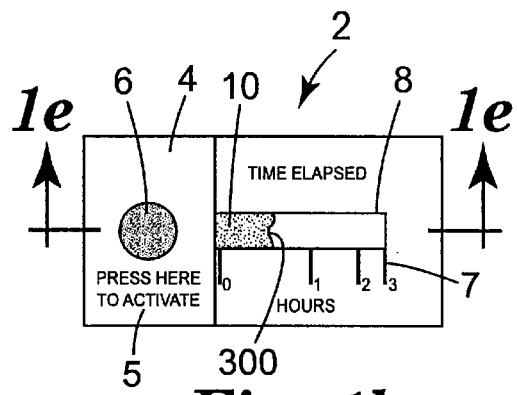
FIG. 1b illustrates a top view of the timer article of FIG. 1a subsequent to activation but prior to expiration.
Figure 1C:
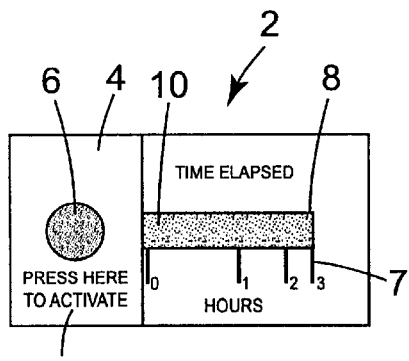
FIG. 1c illustrates a top view of the timer article of FIG. 1b upon expiration.

FIG. 1a illustrates a timer article 2 of the invention. The article 2 includes cover 4. Cover 4 contains printing thereon except for a rectangular section identified as 8 which is left transparent to provide a window so a viewer can observe the fluid flow upon activation. The printing on the cover 4 also includes scale 7, activation point 6, and activation instructions 5. FIG. 1b is identical to FIG. 1a, except that activation has already occurred. A colored bar 10 shows the elapse of time. The edge of the bar 10 which moves over time is identified as 300 and is also known as the fluid flow front. FIG. 1c is identical to FIG. 1b except that the colored bar 10 indicates that there is no more time left to run on the timer article 2.

Figure 2:
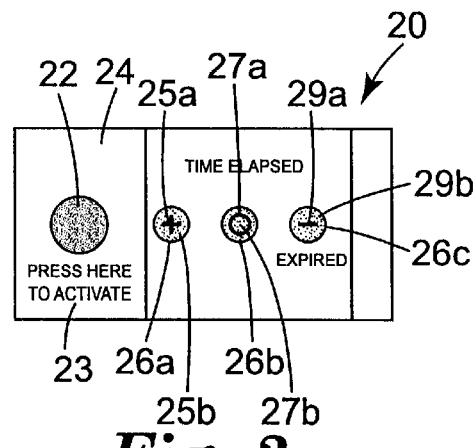
FIG. 2 illustrates a top view of another embodiment of a timer article of the invention.

FIG. 2 is an alternate embodiment of a timer. The article 20 includes cover 24. Cover 24 contains printing thereon except for three circular sections 26a–c which are left transparent so a viewer can observe the fluid flow upon activation. The printing on the cover 4 also includes activation pressure point 22 and activation instructions 23. A plus sign 25a, a zero 27a, and a minus sign 29a appear in windows 26a–c respectively. The symbols 25a, 27a, and 29a are not visible prior to activation. As the fluid travels along the substrate first the plus sign 25a and color 25b appear, then the zero 27a and color 27b appear, and then the minus sign 29a and color 29b appear. The color and symbols appearing in each of the windows 26a–c indicates that the timer 20 has expired.

Figure 3A:
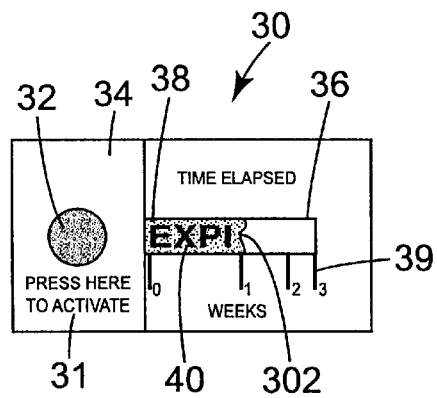
FIG. 3a illustrates a top view of another embodiment of a timer article of the invention subsequent to activation but prior to expiration.
Figure 3B:
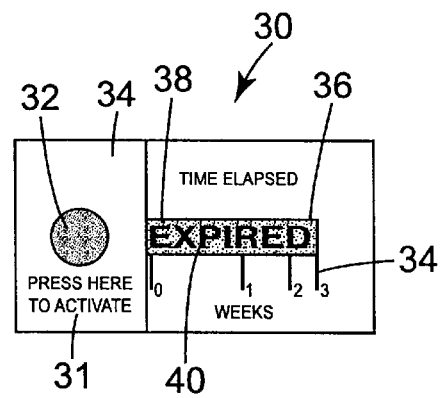
FIG. 3b illustrates a top view of the timer article of FIG. 3a after expiration.

FIG. 3a is another embodiment of the article of the invention. The timer article 30 includes cover 34. Cover 34 contains printing thereon except for a rectangular section identified as 36 which is left transparent to provide a window so a viewer can observe the fluid flow upon activation. The printing on the cover 34 also includes activation pressure point 32, activation instructions 31, and scale 39. The elapse of time is shown by colored bar 38 having fluid flow front 302 and the letters 40 which appear as time progresses. FIG. 3b is identical to FIG. 3a except that time has run out on the timer article 30 as evidenced by the colored bar 38 which fills the window 36 and the extra indication provided by the word "expired" 40 which appears in the window 36.

FIG. 1d is a cross-sectional view of the article of FIG. 1a taken along line 1d—1d. A pouch identified as 3 contains the fluid 5. The dot which marks the activation pressure point is identified as 6. Cover 4 includes a single-sided adhesive tape which forms the top of the cover 4 and includes a film layer 319 and an adhesive layer 15. A layer of microstructured substrate 7 is sandwiched within the cover 4 adjacent to the pouch 3. The unstructured surface of the substrate 7 is identified as 305 and is positioned closest to the window 8. The opposite structured surface of the substrate 7 is identified as 309.

FIG. 1e is a cross-sectional view of the article of FIG. 1b. The pouch 3 has been ruptured to allow the flow of fluid 5 into the channels of the structured surface 309 of the substrate 7. As the fluid 5 fills in the channels of the structured surface 309 it changes the optics of the system to render the formerly opaque substrate 7 clear such that a layer of colored ink 9 on film layer 11 becomes visible to an observer who is peering through the window 8 in FIG. 1b. The bottom of the cover 4 includes a double-sided adhesive tape. A release liner 21 is positioned on the side of the double-sided adhesive tape farthest away from the substrate 7. The double-sided adhesive tape includes film layer 11 and adhesive layers 17 and 19. A slight separation identified as 33 exists between the upper and lower layers of the cover 4. The separation provide a means of escape for the air within the substrate 7 channels which is displaced as the fluid 5 fills and moves along the channels of the substrate 7.

FIG. 1f is an enlarged cross-sectional view of a portion of the timer article 2 of FIG. 1e. The enlargement shows the path of light rays 402 which impinge upon the portion of the substrate 7 where the fluid is not present. Since fluid does not fill the channels of the retroreflective substrate 7 the rays 402 internally reflect and the substrate 7 appears opaque. Light rays 400 which impinge upon the portion of the substrate 7 where the fluid 5 is present in the substrate channels results in that portion of the substrate 7 appearing transparent (due to the frustration of retroreflection) and the viewer observing the colored printed layer 9.

FIG. 4a is a timer article of the invention identified as 50. The cover 58 which has printing thereon contains a transparent portion which forms a window 70 which allows a viewer to view the travel of the fluid and thus the passage of time. The cover 58 also includes a scale 71, activation instructions 68, and a pull tab 66 which serves to activate the article 50 by removing the barrier (not shown in this figure) so that the fluid can contact the substrate 60 and fill and flow within its channels.

FIG. 4b is a cross-sectional view of the article 50 of FIG. 4a taken along line 4b—4b. Reservoir 52 holds the fluid 54 until activation is desired. Barrier 53 can be removed to commence activation. The retroreflective substrate 60 is positioned adjacent to the barrier 53. The smooth unstructured surface of the substrate 60 is identified as 332. The structured surface of the substrate 60 is identified as 330. The upper layer of the cover 58 is a single-sided adhesive tape having printing thereon comprising film layer 59, adhesive layer 57, and printed layer 404. The lower layer of the cover 58 is a single-sided adhesive tape comprising film layer 64 and adhesive layer 56. A colored printed layer 62 exists between film layer 64 and adhesive layer 56. The printed layer 62 can be viewed by an observer through window 70 as the fluid 54 progresses through the substrate 60 channels rendering increasing portions of the substrate 60 transparent over time. A slight separation identified as 55 exists between the upper and lower layers of the cover 58. The separation provides a means of escape for the air within the substrate 60 channels which is displaced as the fluid 54 fills and moves along the substrate 60 channels.

FIG. 5a is an alternate embodiment of a timer article of the invention shown in cross-section. The article 80 comprises pouch 84 containing fluid 86. The cover 406 comprises an upper layer and a lower layer. The upper layer of the cover comprises a single-sided adhesive tape with printing thereon. The single-sided adhesive tape comprises film layer 340, adhesive layer 88, and printing 408. The lower layer of the cover comprises a single-sided adhesive tape comprising film layer 343 and adhesive layer 342. The liquid 86 in this embodiment is colored and forms a contrasting image as it travels along the substrate 106. The liquid 86 flows within a series of parallel v-shaped channels 82 in the upper surface of the substrate 106. A slight separation identified as 101 exists between the upper and lower layers of the cover 406. The separation 101 provides a means of escape for the air within the substrate 106 channels which is displaced as the fluid 86 moves along the substrate 106.

FIG. 5b is a cross-sectional view of the article of FIG. 5a taken along line 5b—5b which more clearly shows the liquid 86 flowing through the parallel v-shaped channels of the substrate 106.

FIG. 6 is a cross-sectional view of another embodiment of the timer article of the invention. The article 110 includes one-piece unit 120 which includes a microstructured retroreflective surface 128 adjacent to a fluid reservoir 122 which contains fluid 124. A weak adhesive 130 serves as a barrier between the reservoir 122 and the structured surface 128 until activation. A layer of laminating adhesive 126 is positioned against the open side of the fluid reservoir 122, the barrier 130, and the microstructured surface 128. A layer of ink 127 is on an opposite side of the laminating adhesive 126. The ink 127 becomes visible upon activation of the article as the fluid begins to fill the voids within the retroreflective microstructured surface 128. The layer of ink 127 is printed on a single-sided adhesive tape comprising film layer 132 and pressure sensitive adhesive layer 121. Graphics 123 appear on the smooth top side of the one-piece unit 120. A sufficient portion of the unit 120 is left free of graphics to provide a window through which an observer can view the fluid flow.

FIG. 7a is another embodiment of the article of the invention. The article 150 includes a cover 151. An activation point 154, having activation instructions 156 thereon, and a window 152 is present in cover 151. The outer perimeter of the window 152 is identified as 155 and the inner perimeter of the window is identified as 153. The cover 151 contains a scale 158. FIG. 7b is identical to FIG. 7a except that the article has been activated and the colored ring 160 is indicative of the fluid flow. The fluid flow front is identified as 162.

FIG. 8 illustrates a microstructured substrate 180 which is useful in an article of the invention. The substrate 180 has a series of parallel v-shaped channels 184. The peaks of the substrate 180 are identified as 182. Since the substrate 180 is not retroreflective it would be used in a manner wherein a contrasting fluid flows through the channels of the substrate 180 such that the fluid is between the window of the article and the substrate 180. The substrate 180 is the same as the substrate 106 that is present in the article of FIGS. 5a–5b. The channel width is identified as 181 and the channel depth is identified as 183.

FIG. 9 illustrates a microstructured substrate 201 which is useful in an article of the invention. The substrate 201 has a series of square u-shaped channels. The bases of the channels are identified as 203. The sides of the channels are identified as 202. Since the substrate 201 is not retroreflective it would be used in a manner wherein a contrasting fluid flows through the channels of the substrate 201 such that the fluid is between the window of the article and the substrate 201. The channel width is identified as 204 and the channel depth is identified as 205.

FIG. 10 illustrates a microstructured substrate 220 which is useful in an article of the invention. The substrate 220 has a series of semi-circle-shaped channels. The bases of the channels are identified as 222. The sides of the channels are identified as 224. Since the substrate 220 is not retroreflective it would be used in a manner wherein a contrasting fluid flows through the channels of the substrate 220 such that the fluid is between the window of the article and the substrate. The channel width is identified as 223 and the channel depth is identified as 225.

FIG. 11 illustrates a microstructured substrate 230 wherein the microstructured surface the liquid is to migrate through and fill is internal to the substrate 230 and is formed by microstructured film 232 and microstructured film 234 which are joined together at their microstructured surfaces FIG. 12a illustrates a perspective view of a microstructured susbstrate which is useful in an article of the present invention. This microstructured substrate 240 which has a cube-corner pattern is a known material and is similar to the materials disclosed in U.S. Pat. Nos. 5,691,846; 5,450,235; and 4,588,258; all incorporated by reference herein. The substrate 240 peaks are identified as 244 and the substrate 240 depressions which form channels are identified as 246. The smooth unstructured surface of the substrate 240 is identified as 242. FIG. 12b is a top plan view of the microstructured substrate of FIG. 12a. FIG. 12c is a cross-sectional view of the structured substrate of FIG. 12b taken along line 12c—12c. The depth of the channels is identified as 245. The widths of the wider channel portion are identified as 243 and the widths of the narrower channel portions are identified as 247. Even though the channels have differing widths in portions the fluid flow front would still be relatively even due to the microstructured nature of the channels (that is the regularity of the projections) and the interconnection of the channels which helps to regulate and maintain consistency of the fluid flow.

FIG. 13a illustrates an article 290 of the invention which is designed as a game piece. The article 290 includes cover 294. Cover 294 contains printing thereon except for a rectangular section identified as 296 which is left transparent to provide a window so a viewer can observe the fluid flow upon activation. The printing on the cover 294 also includes activation point 292 and activation instructions 301. FIG. 13b is identical to FIG. 13a, except that activation has already occurred. A colored bar 297 and dollar amount of $1000 (298) appear after the designated timer period.

FIG. 14a is an embodiment of a time/temperature indicator of the invention prior to activation. The article 260 includes cover 264. Cover 264 contains printing thereon except for three circular sections 274a–c which are left transparent so a viewer can observe the fluid flow upon activation. The printing on the cover 264 also includes activation pressure point 262 and activation instructions 272. FIG. 14b is identical to FIG. 14a except that activation has already occurred. A plus sign 266, a zero 268, and a minus sign 270 appear in windows 274a–c respectively. The symbols 266, 268, and 270 are not visible prior to activation. As the fluid travels along the substrate first the plus sign 266 and color 271 appear, then the zero 268 and color 273 appear, and then the minus sign 270 and color 275 appear. The color and symbols appearing in each of the windows 274a–c indicates that the timer has expired.

FIG. 15a is another embodiment of an article of the invention which is designed as a furnace filter reminder. The article 400 includes cover 402, activation instructions 408, activation pressure point 406, and a transparent rectangular portion of the cover 404 through which an observer can view the flow of the fluid upon activation. FIG. 15b is identical to the article of 15a except that activation has occurred and enough time has elapsed that the reminder now indicates that it is time to change the filter. The color that appears in the window is identified as 411 and the instructions to "change filter" are identified as 410.

FIG. 16 illustrates an exploded perspective view of another article of the invention. The timer article 420 includes a die-cut pressure sensitive adhesive layer 424 that contains a cut-out 422 which forms a fluid reservoir that contains fluid 421. The die-cut pressure sensitive adhesive 424 also includes a cut-out 426 which contains the microstructured substrate 427. A barrier 425 which is a very thin rupturable section of the pressure sensitive adhesive layer 424 separates the fluid from the substrate 427. A laminating pressure sensitive adhesive 428 bonds the die-cut pressure sensitive adhesive 424 to a layer of ink 430 and laminates the structured side of the microstructured substrate 427. The opposite side of the ink layer 430 is bonded to a double sided pressure sensitive adhesive tape comprising adhesive layers 432 and 436 and film layer 434 therebetween. A single-sided adhesive tape comprising film layer 445, pressure sensitive adhesive layer 446 bonded to one side of film layer 445, and a graphics layer 424 printed on the opposite side of film layer 445 is bonded to die-cut pressure sensitive adhesive layer 424. The graphics layer 424 includes activation instructions 441, activation pressure point 440, and scale 443. A rectangular portion 442 of the transparent film 445 is left transparent to allow an observer to view fluid flow upon activation.

FIG. 17a illustrates another embodiment of an article of the invention. The article 450 is a birth announcement. The cover 460 contains printing thereon except for an irregular shaped section 454 which is left transparent to view the flow of the fluid. The window and the substrate underlying the window both have essentially a backward s-shape. In some cases one may wish for the window to be irregular in shape-such as star-shaped, flower-shaped, etc. but to have the underlying substrate be of rectangular shape. However, if one chooses a substrate with interconnecting paths rather than parallel channels, for example, one can more readily have a substrate shape that is irregular since the fluid would have a continuous path to flow through. Thus, in some situations the window may be identical or substantially similar in shape to the substrate. In other situations the window may have a different shape than the substrate. Typically the substrate is larger than the window. Activation instructions and pressure point are identified as 452. FIG. 17b is the same as FIG. 17a except that the article 450 has been activated and enough time has elapsed for the message 456 to come into view. The color in the window is identified as 455.

It is preferable that the fluid flow front of the article of the invention be as even as possible.

For example, FIG. 18a shows a top view of a portion of an another embodiment of an article 500 which includes cover 502 and a transparent portion 504 therein which forms a window through which an observer can view the fluid flow along substrate 503. The colored bar that appears in the window is identified as 506. The fluid flow front is identified as 508. In FIG. 18a the variation in the fluid flow front is nonexistent.

FIG. 18b shows a top view of a portion of another embodiment of an article 520 which includes cover 522 and a transparent portion 524 therein which forms a window through which an observer can view the fluid flow along substrate 525. The colored bar that appears in the window is identified as 526. The fluid flow front is identified as 528. In FIG. 18b the variation 530 in the fluid flow front 528 is greater than in FIG. 18a. When reading a scale that has a crescent-shaped fluid flow front with no peaks, one measures the variation as 530 shows but the actual reading of time elapsed would be at the bottom of the crescent, that is at point 527. This is because the sides of the crescent are typically formed due to fluid leaking along the sides of the substrate and entering it from the sides. The sides of the crescent are thus less accurate than the bottom of the crescent It is still preferable however to have a straight line rather than a crescent shape since a crescent shape could be confusing to an observer.

FIG. 18c shows a top view of a portion 540 of another embodiment of an article of the invention which includes cover 542 and a transparent portion 544 therein which forms a window through which an observer can view the fluid flow along substrate 545. The colored bar that appears in the window is identified as 546. The fluid flow front is identified as 548. In FIG. 18c the variation in the fluid flow front is identified as 550. To read such a scale that has peaks one would look at the mid-point in distance between the two farthest points along the fluid flow front in the direction of fluid flow. However, it is preferred that the fluid flow front contain minimal and small peaks, if any, preferably none.

The appearance of peaks is less esthetically pleasing and makes a scale more difficult to read. If the fluid flow front is a crescent shape with any peaks at all it is read using the method of FIG. 18c rather than FIG. 18b. Any other fluid flow fronts other than a pure crescent as shown in FIG. 18b or a uniform front as shown in FIG. 18a would also be read as in FIG. 18c.

Preferably the fluid flow front has no meniscus, no peaks and is even. For a rectangular substrate portion as in FIGS. 18a–c the fluid flow front is most preferably a straight line as in FIG. 18a. For a ring-shaped substrate as in FIG. 7a the fluid flow front is preferably a symmetrical ring.

When observing the fluid flow front and observing any variation one does so only by looking through the window or other means provided on the article to view the fluid flow. If a portion of the substrate contains part of the fluid flow but is covered by an opaque portion of a cover, for example, and thus is not visible to an observer it is not to be included in any measurement. Note FIGS. 18a–c wherein measurements are only based on the fluid flow front visible through the windows.

Typically the fluid flow front has a variation of less than about 5 mm, preferably less than about 4 mm, more preferably less than about 3 mm, even more preferably less than about 2 mm, and most preferably less than about 1 mm.

FIG. 19a illustrates another embodiment of a timer article of the invention which would be useful as a timer for a home permanent kit in which a user is to apply a permanent solution followed by a neutralizer solution to their hair. The article actually includes two timers. The first is a permanent solution timer 604. The second is a neutralizer solution timer 612. Upon applying the permanent solution to one's hair one would activate the permanent solution timer 604. Upon expiration of that timer 604 one would rinse off the permanent solution and apply the neutralizer solution to one's hair and then activate the neutralizer solution timer 612.

The article 600 includes cover 606. Cover 606 contains printing thereon except for two rectangular sections one of which is identified as 607 which is left transparent to provide a window so a viewer can observe the fluid flow upon activation of the permanent solution timer 604. The window 614 allows a viewer to observe the fluid flow upon activation of the neutralizer solution timer 612. The printing on the cover 606 also includes activation points 602 and 610 and timer identifications 604 and 612. FIG. 19b is identical to FIG. 19a except that activation of the permanent solution timer 604 has already occurred. A colored bar 620 and words 622 shows that the permanent solution timer 604 has expired. FIG. 19c is identical to FIG. 19b except that the neutralizer solution timer 612 has been activated and the color 630 and words 632 appearing in the window 614 indicate that the neutralization solution timer 612 has expired.

In this particular embodiment (FIGS. 19a–c) the timers are designed to be activated consecutively and independently rather than concurrently. The substrates 609 and 611 are positioned far enough apart and the article designed such that fluid from one substrate does not flow onto the substrate of an adjacent timer. If one substrate is used for both fluid flow paths it should preferably be divided or somehow sealed in the center thereof to prevent fluid from crossing over into the adjacent fluid flow path. In this embodiment, for both the permanent solution timer 604 and neutralizer solution timer 612 the same fluid is used but in separate reservoirs, for example in two separate pouches. Since for the permanent kit each solution is to remain separately on the hair for a different period of time each timer would be designed to expire at different time by selection of different substrates.

In this embodiment (FIGS. 19a–c) the same fluid is used for both timer portions but substrates having differing fluid flow rates are used. Alternatively the same substrate type could be used for both timer portions as long as a different fluid is used for each timer portion wherein each fluid would flow through the substrate at a different rate. Alternatively both the fluid and the substrates could be selected to be different as long as the desired timing is achieved. As an alternative one could potentially used the same fluid and substrates of the same compostion but use substrates of different lengths to achieve the desired expiration time.

FIG. 20a is a timer article of the invention identified as 700. The cover 705 which has printing thereon contains three separate transparent portions which form windows 706, 712, and 720 respectively which allows a viewer to view the travel of the fluid and thus the passage of time. The cover 705 also includes scales 710, 716, and 724 which are in hours, days and weeks, respectively, and which correspond to windows 706, 712, and 720, respectively; activation instructions 704; and a pull tab 702 which serves to activate the article 700 by removing the barrier (not shown in this figure) so that the fluid can contact the substrates 708, 714, and 722 and flow within their channels. The same fluid is used within this article embodiment. However, the adjacent substrates 708, 714, and 722 differ in configuration such that fluid flows through each of them at different rates. The article is also designed such that fluid cannot flow from one substrate onto another. This could be accomplished by the use of a fluid impermeable barrier between the substrates, for example. The article 700 is designed such that the fluid contacts each substrate upon activation of the article. FIG. 20b is identical to FIG. 20a except that activation has already occurred. A colored bar 730 shows that the four hour timer has elapsed. Colored bar 732 shows the elapse of two days via fluid flow front 734. Colored bar 736 shows also via fluid flow front 738 that two days has elapsed but in a fraction of a week. Such a timer article 700 could be used, for example, for reminder for medical procedures wherein a reminder is necessary after four hours, four days, and four weeks and wherein it would be difficult to note those reminders on a several week scale.

FIG. 21a illustrates a perspective view of a timer article 902 of the invention positioned on a box 900. The timer article 902 includes an opaque cover 906 which includes a transparent rectangular potion 908 through which one can view substrate 910 and fluid reservoir 918 which contains fluid 920. The fluid 918 is separated from substrate edge 912 by space 916. As long as the box 900 to which the article 902 is attached remains upright the article 902 remains inactivated. Activation occurs when box 900 becomes inverted as in FIG. 1b wherein fluid 920 now contacts substrate edge 912. The scale 914 is in hours.

This article 902 is useful on objects which can become damaged or inoperative if inverted for a period of time. Such an article 902 should be designed such that flow of the fluid 920 is primarily, preferably essentially, most preferably completely via capillary action only so that if the box 900 is placed right side up after a period of inversion that the fluid 920 remains in the substrate 910 and does not drain back into the fluid reservoir 918. Preferably space 916 is large enough such that the fluid 920 would not inadvertently splash on the substrate edge 912 as the box 900 is moved in an upright position. Number 922 identifies a colored bar showing progress of the fluid 920 flow.

However, if it is important that the box not even be moved an article could be designed such that mere movement of the article could trigger activation. This could be done, for example, by positioning the fluid extremely close to the substrate. Optionally one could include a barrier such as a pull tab which keeps the fluid from the substrate during shipping, for example. When the article is positioned for use the barrier could be removed and then any tilting, inversion, etc. could be recorded.

FIG. 22a is a cross-sectional side view of another embodiment of an article of the invention. The article 930 includes a reservoir 936 which contains fluid 934. A removable barrier 937 can be removed by pulling a pull-tab 953 (shown in FIG. 22b). FIG. 22b is a top view of the article of FIG. 22a. Two retroreflective cube-corner substrates 938 and 940 are positioned such that the structured surface of substrate 938 lies on top of the smooth unstructured surface of substrate 940. Substrates 938 and 940 are selected such that fluid 934 flows through them at different rates. In this embodiment fluid flows through the channels of substrate 938 faster than the channels of substrate 940.

The article 930 also includes a cover comprising on its top portion film layer 932, pressure sensitive adhesive layer 933, transparent window 952, scale 963 and activation instructions 951. The bottom portion of the cover comprises film layer 953 and pressure sensitive adhesive layer 955. A slight opening 939 exists between the upper and lower cover portions. Upon removal of the barrier 937 the fluid 934 enters the channels of substrate 938 as well as the channels 940. (See FIGS. 22b–c.) FIG. 22c is a side cross-sectional view of the article of FIG. 22a after activation. The color 956 which appears in FIG. 22b is the same as the ink layer 942 positioned below substrate 940. This is because the channels of both substrate 938 and 940 are full in that area rendering each substrate transparent so that one can view ink layer 942.

In area 960 of the article 930 a color appears which is the same as the color of the lower substrate 940. This is because the channels in a portion of the upper substrate 938 are full rendering it transparent but the channel portions of substrate 940 directly below are not full so that the lower substrate 940 is not transparent.

The fluid flow front of the fluid flowing through the upper substrate 938 is identified as 962. The fluid flow front of the fluid flowing through the lower substrate 940 is identified as 958. (See FIGS. 22b–c)

It would be possible to provide additional substrate layers beyond two although each substrate layer should preferably have a different run time for the fluid used when only one fluid is used. The substrates may be stacked one upon another in any order although the substrate are preferably stacked in order of run-out time, with the fastest running substrate on top. It may also be possible to provide graphics under one or more substrate layers, on top of the article, etc. This embodiment where one layer is stacked up another could also be useful for nonretroreflective substrates especially if the substrates are chosen to be transparent. The progress of fluid through two substrates, for example, could be determined readily by a viewer since two layers of a colored fluid for example, would appear darker than a single layer of a colored fluid.

Other embodiments using multiple substrates and/or fluids are possible. In some embodiments it may not be preferred to have the fastest running substrates on top. This could be the case for example, for articles which are not relying on a frustration of optical properties.

In an alternative embodiment for an article containing multiple substrates stacked one upon each other, a separate source of fluid and optionally a barrier for each substrate could be provided. The substrates could be sufficiently separated or a barrier provided there-between to prevent fluid from migrating from one substrate to another. Each substrate fluid combination could be activated simultaneously or consecutively, for example.

Capillary Action Test Method

One can employ the following test to determine if the flow of fluid through the channels of the article is primarily by capillary action. First obtain two identical articles. Place one article of a flat horizontal surface so that gravity will not affect the article and record the time it takes the fluid to reach a marked unit or end of the visible fluid flow path upon activation of the article. Position the second article vertically such that as much of the fluid flow path as possible is in an upward direction. Measure the time it takes to reach the same unit or end of the visible fluid flow path. The default measurement for this test is for the fluid to reach the end of the fluid flow path. Preferably the time on the vertical timer is within ±50 percent of the time on the horizontal timer, more preferably within ±40 percent of the time on the horizontal timer, even more preferably within ±30 percent of the time on the horizontal timer, even more preferably within about ±25 percent of the time on the horizontal timer, even more preferably within about ±20 percent of the time on the horizontal timer, even more preferably within about ±15 percent of the time on the horizontal timer, even more preferably within about ±10 percent of the time on the horizontal timer even more preferably within about ±5 percent of the time on the horizontal timer, even more preferably within about ±4 percent of the time on the horizontal timer, even more preferably within about ±3 percent of the time on the horizontal timer, even more preferably within about ±2 percent of the time on the horizontal timer, even more preferably within about ±1 percent of the time on the horizontal timer, even more preferably within about ±0.5 percent of the time on the horizontal timer, and most preferably the same time as the horizontal timer.

EXAMPLES

The present invention will be further described by the following non-limiting examples.

Description of Channeled Microstructured Substrate

An embodiment of the channeled microstructured substrate is shown in FIGS. 23a–b. The microstructured substrate herein referred to as channeled microstructured substrate was formed generally according to the process disclosed in U.S. Pat. Nos. 5,514,120 and 5,728,446 by casting a molten polymer onto a microstructured nickel tool to form a continuous film with channels on one structured surface. The channels were formed in the continuous length of the cast film. The tool used to form the film produced a microstructured surface on the film layer with a channel profile having primary grooves with a primary groove 970 angular width of 10°, a primary groove spacing 971 of 229 microns, a primary groove depth 972 of 203 micrometers, and a notch included angle 973 of 95°, and secondary grooves with a secondary groove angular width 974 of 95°, a secondary groove spacing 975 of 50 micrometers, and a secondary groove depth 976 of 41 microns. The channels had a primary peak top width 977 of 29 microns and a secondary peak top width 978 of 29 microns as well as a primary groove base width 979 of 163 microns and a secondary groove base 980 width of 13 microns. The polymer used to form the film was low-density polyethylene, Tenite™155OP from Eastman Chemical Company, Kingsport, Tenn. A nonionic surfactant, Triton X-100 from Union Carbide Corporation, Danbury, Conn. was melt blended into the base polymer to increase the surface energy and wettability of the film.

Laminate Pressure Sensitive Adhesive Tape Prepartion

Pressure sensitive adhesive compositions for solvent coated tapes used to laminate the microstructured surfaces, were prepared in the following way as described in copending U.S. patent application Ser. No. 09/496,831, Khandpur et al. (filed Feb. 2, 2000) entitled "ADHESIVE FOR BONDING TO LOW SURFACE SURFACES", incorporated by reference herein. The components of the formulations (described below) were placed in a glass jar and dissolved in toluene to give a 40% by weight solution. The solutions were separately knife coated onto a 50 micron (2 mil) silicone coated polyethylene terephthalate (PET) release liner. The coatings were dried in a preheated air circulated oven maintained at 70 degrees C. for 15 minutes such that the resulting dry adhesive layer thickness was 125 microns (5 mil). The transfer tapes so obtained were covered with a protective silicone coated paper release liner. Samples were then irradiated with electron beam (EB) radiation using an Electrocurtain CB-300 electron beam system (available from Energy Sciences Inc., Wilmington, Mass.) at 175 keV and a dose of 4 Mrad. Before irradiation, the protective silicone coated paper liner was removed.

Tape A included 25 g of polymodal block copolymer elastomer made according to the method for Polymer B descirbed U.S. Pat. No. 5,393,787 incorporated by reference herein. The polymer had a $M_n$=4,000 and 21,500 for the two endblocks, 135,400 and 1,087,000 for the star, 31.56 grams of Regalite™S101 available from Hercules, Wilmington, Del., 0.64 g of Escorez 2520 available from Exxon Chemical, Houston, Tex, and 0.5 g of Irganox 1010 available from CIBA, Hawthorne, N.Y.

Tape B included 25 g of polymodal block copolymer elastomer as described in Tape A, 32.74 grams of Regalite S101, 4.70 g of Escorez 2520, and 0.5 g of Irganox 1010

After the transfer tape was cured one of the release liners of the transfer tape was then removed and the pressure sensitive adhesive was laminated to a primed polyethylene terephthalate (PET) backing resulting in a pressure sensitive adhesive tape ready for lamination to the microstructued substrates. The backside of the PET backing was colored with a black permanent marker to enhance contrast prior to lamination with retroreflective materials was done.

Example 1

A strip of the microstructured substrate Scotchlite™ Reflective Material Series 6200 High Gloss Film (commercially available from 3M Company, St. Paul, Minn.) 3 centimeters long by 1 centimeter wide was laminated with a piece of either one of the pressure sensitive adhesive tapes described above such that the adhesive laminates to the structured surface of the microstructured substrate. This laminated construction was placed on a flat horizontal surface and the fluid that was a blend of Poly (dimethylsiloxane) 200™ Fluids (commercially available from Dow Corning Corporation, Midland, Mich.) to give the viscosity shown in Table 1, was introduced into the fluid flow channels by contacting the microstructured substrate laminate to a reservoir containing the fluid in order to start the indicator. Progress of the fluid flow front with time was monitored through the use of a camera and imaging software. When the fluid had flowed 2 centimeters, the test was stopped and the time in minutes was recorded as the Run Time. The measured Run Time as well as the predicted Run Time are shown in Table 1. The predicted Run Time was calculated using the model defined by the following equation:

$$RunTime = \frac{d^2 \mu}{4 l \gamma} \frac{1}{60}$$

where:
  d was the distance traveled by the fluid along the microfluidic structure (i.e. 2 cm or 0.02 meters);
  l was the effective opening size of the channels in the microstructured substrate laminate, and is defined as $p/C_R$ where p is perimeter of the channel opening and $C_R$ is the Geometry Coefficient as defined in M. Richter et al, *Sensors and Actuators*, A 62, 1997, 480–483.

When direct measurement of the channel perimeter or when the Geometry Coefficient $C_R$ was not available, l was calculated by using a reference fluid of known viscosity and surface tension and measuring the run time in seconds for this reference fluid to travel a given distance along the microstructured substrate laminate when this laminate was on a horizontal surface, and using the following equation to calculate a value for l in meters:

$$l = \frac{d^2 \mu}{4(RunTime)\gamma}$$

This calculated value of l describes the effective channel opening for the microstructured substrate laminate and can then be used to predict the run times for other fluids.; γ was the surface tension of the fluid employed in Pascal seconds (Pa·s); μ was the viscosity of the fluid in Newtons per meter (N/m).
All of the quantities defined above are known or were measured independently of each other. For this example: d was 0.02 m, l was 4.5×10$^{-6}$ m, μ was 546 Pa·s, and γ was 21×10$^{-3}$ N/m.

Example 2

The same procedure described for Example 1 was followed with the microstructured substrate Scotchlite™ Reflective Material Series 6200 High Gloss Film (commercially available from 3M Company, St. Paul, Minn.) and fluid that was a blend of Poly(dimethylsiloxane) 200™ Fluids (commercially available from Dow Corning Corporation, Midland, Minn.) to give the viscosity shown in Table 1. The measured and predicted Run Times in minutes are shown in Table 1. Predicted Run Time was calculated using the model described in Example 1 with the following parameter values: d was 0.02 m, l was 4.5×10$^{-6}$ m, μ was 406 Pa·s, and γ was 21×10$^{-3}$ N/m.

Example 3

The same procedure described for Example 1 was followed with the microstructured substrate Scotchlite™ Reflective Material Series 6200 High Gloss Film (commercially available from 3M Company, St. Paul, Minn) and a fluid that was a blend of Poly(dimethylsiloxane) 200™ Fluids (commercially available from Dow Corning Corporation, Midland, Mich.) to give the viscosity shown in Table 1. The measured and predicted Run Times in minutes are shown in Table 1. Predicted Run Time was calculated using the model described in Example 1 with the following parameter values: d was 0.02 m, l was 4.5×10$^{-6}$ m, μ was 36 Pa·s, and γ was 21×10$^{-3}$ N/m.

Example 4

The same procedure described for Example 1 was followed with the microstructured substrate Scotchlite™ Reflective Material Series 6200 High Gloss Film (commercially available from 3M Company, St. Paul, Minn.) and fluid that was a Poly(dimethylsiloxane) 200™ Fluid (commercially available from Dow Corning Corporation, Midland, Mich.) with a viscosity shown in Table 1. The measured and predicted Run Times in minutes are shown in Table 1. Predicted Run Time was calculated using the model described in Example 1 with the following parameter values: d was 0.02 m, l was 4.5×10$^{-6}$ m, μ was 10 Pa·s, and γ was 21×10$^{-3}$ N/m.

Example 5

The same procedure described for Example 1 was followed with the microstructured substrate Scotchlite™ Reflective Material Series 6200 High Gloss Film (commercially available from 3M Company, St. Paul, Minn.) and a fluid that was a Poly(dimethylsiloxane) 200™ Fluid (commercially available from Dow Corning Corporation, Midland, Mich.) with a viscosity shown in Table 1. The measured and predicted Run Times in minutes are shown in Table 1. Predicted Run Time was calculated using the model described in Example 1 with the following parameter values: d was 0.02 m, l was 4.5×10$^{-6}$ m, μ was 1 Pa·s, and γ was 21×10$^{-3}$ N/m.

Example 6

The same procedure described for Example 1 was followed with the channeled microstructured substrate described above and a fluid that was a blend of Poly (dimethylsiloxane) 200™ Fluids (commercially available from Dow Corning Corporation, Midland, Mich.) to give the viscosity shown in Table 1. To visualize the flow of the fluid along the microstructured substrate laminate the fluid was dyed using Solvent Blue 35 (commercially available from Aldrich Chemical Company, Milwaukee, Wis.). The measured and predicted Run Times in minutes are shown in Table 1. Predicted Run Time was calculated using the model described in Example 1 with the following parameter values: d was 0.02 m, l was 9.9×10$^{-6}$ m, μ was 71 Pa·s, and γ was 21×10$^{-3}$ N/m.

Example 7

The same procedure described for Example 1 was followed with the channeled microstructured substrate described above and a fluid that was a Poly (dimethylsiloxane) 200™ Fluid (commercially available from Dow Corning Corporation, Midland, Mich.) with a viscosity shown in Table 1. To visualize the flow of the fluid along the microstructured substrate laminate the fluid was dyed using Solvent Blue 35 (commercially available from Aldrich Chemical Company, Milwaukee, Wis.). The measured and predicted Run Times in minutes are shown in Table 1. Predicted Run Time was calculated using the model described in Example 1 with the following parameter values: d was 0.02 m, l was 9.9×10$^{-6}$ m, µ was 5 Pa·s, and γ was 21×10$^{-3}$ N/m.

Example 8

The same procedure described for Example 1 was followed with the channeled microstructured substrate described above and a fluid that was a Poly (dimethylsiloxane) 200™ Fluid (commercially available from Dow Corning Corporation, Midland, Mich.) with a viscosity shown in Table 1. To visualize the flow of the fluid along the microstructured substrate laminate the fluid was dyed using Solvent Blue 35 (commercially available from Aldrich Chemical Company, Milwaukee, Wis.). The measured and predicted Run Times in minutes are shown in Table 1. Predicted Run Time was calculated using the model described in Example 1 with the following parameter values: d was 0.02 m, l was 9.9×10$^{-6}$ m, µ was 1 Pa·s, and γ was 21×10$^{-3}$ N/m.

Example 9

The same procedure described for Example 1 was followed with the channeled microstructured substrate described above and a fluid that was a Poly (dimethylsiloxane) 200™ Fluid (commercially available from Dow Corning Corporation, Midland, Mich.) with a viscosity shown in Table 1. To visualize the flow of the fluid along the microstructured substrate laminate the fluid was dyed using Solvent Blue 35 (commercially available from Aldrich Chemical Company, Milwaukee, Wis.). The measured and predicted Run Times in minutes are shown in Table 1. Predicted Run Time was calculated using the model described in Example 1 with the following parameter values: d was 0.02 m, l was 9.9×10$^{-6}$ m, µ was 0.5 Pa·s, and γ was 21×10$^{-3}$ N/m.

Example 10

The same procedure described for Example 1 was followed with the channeled microstructured substrate described above and a fluid that was a Poly (dimethylsiloxane) 200™ Fluid (commercially available from Dow Corning Corporation, Midland, Mich.) with a viscosity shown in Table 1. To visualize the flow of the fluid along the microstructured substrate laminate the fluid was dyed using Solvent Blue 35 (commercially available from Aldrich Chemical Company, Milwaukee, Wis.). The measured and predicted Run Times in minutes are shown in Table 1. Predicted Run Time was calculated using the model described in Example 1 with the following parameter values: d was 0.02 m, l was 9.9×10$^{-6}$ m, µ was 0.1 Pa·s, and γ was 21×10$^{-3}$ N/m.

TABLE 1

| Example | Substrate | Fluid | Fluid viscosity (Pa·s) | Run Time (min) | Predicted Run Time (min) |
|---|---|---|---|---|---|
| 1 | 3M Scotchlite ™ Reflective Material | Dow Corning Poly(dimethylsiloxane) 200 ™ Fluid Blend | 546 | 9335 | 9630 |
| 2 | 3M Scotchlite ™ Reflective Material | Dow Corning Poly(dimethylsiloxane) 200 ™ Fluid Blend | 406 | 7050 | 7160 |
| 3 | 3M Scotchlite ™ Reflective Material | Dow Corning Poly(dimethylsiloxane) 200 ™ Fluid Blend | 36 | 664 | 635 |
| 4 | 3M Scotchlite ™ Reflective Material | Dow Corning Poly(dimethylsiloxane) 200 ™ Fluid | 10 | 198 | 176 |
| 5 | 3M Scotchlite ™ Reflective Material | Dow Corning Poly(dimethylsiloxane) 200 ™ Fluid | 1 | 18 | 18 |
| 6 | Channeled Microstructured Substrate | Dow Corning Poly(dimethylsiloxane) 200 ™ Fluid Blend | 71 | 667 | 569 |
| 7 | Channeled Microstructured Substrate | Dow Corning Poly(dimethylsiloxane) 200 ™ Fluid | 5 | 42 | 40 |
| 8 | Channeled Microstructured Substrate | Dow Corning Poly(dimethylsiloxane) 200 ™ Fluid | 1 | 8 | 8 |
| 9 | Channeled Microstructured Substrate | Dow Corning Poly(dimethylsiloxane) 200 ™ Fluid | 0.5 | 5 | 4 |
| 10 | Channeled Microstructured Substrate | Dow Corning Poly(dimethylsiloxane) 200 ™ Fluid | 0.1 | 1 | 0.8 |

Example 11

The same laminate described for Example 1 was prepared. The laminate was then placed on a vertical surface and the same fluid described in Example 1 was introduced by contacting the bottom of the laminate to a reservoir containing the fluid. The Run Time in minutes on a vertical surface as well as the Run Time in minutes when on a horizontal surface are shown in Table 2.

Example 12

The same laminate described for Example 3 was prepared. The laminate was then placed on a vertical surface and the same fluid described in Example 3 was introduced by contacting the bottom of the laminate to a reservoir containing the fluid. The Run Time in minutes on a vertical surface as well as the Run Time in minutes when on a horizontal surface are shown in Table 2.

Example 13

The same laminate described for Example 6 was prepared. The laminate was then placed on a vertical surface and the same fluid described in Example 6 was introduced by contacting the bottom of the laminate to a reservoir containing the fluid. To visualize the flow of the fluid along the microstructured substrate laminate the fluid was dyed using Solvent Blue 35 (commercially available from Aldrich Chemical Company, Milwaukee, Wis.). The Run Time in minutes on a vertical surface as well as the Run Time in minutes when on a horizontal surface are shown in Table 2.

Example 14

The same laminate described for Example 7 was prepared. The laminate was then placed on a vertical surface and the fluid was introduced by contacting the bottom of the laminate to a reservoir containing the fluid. To visualize the flow of the fluid along the microstructured substrate laminate the fluid was dyed using Solvent Blue 35 (commercially available from Aldrich Chemical Company, Milwaukee, Wis.). The Run Time in minutes on a vertical surface as well as the Run Time in minutes when on a horizontal surface are shown in Table 2.

flow channels by contacting the microstructured substrate laminate to a reservoir containing the fluid in order to start the indicator. Progress of the fluid flow front with time was monitored through the use of a camera and imaging software. Progress of the fluid flow front with time was monitored through the use of a camera and imaging software. Table 3 shows the time elapsed in minutes for the fluid to reach selected distances along the microstructured substrate laminate. The predicted time elapsed values in minutes are calculated using the model defined by the following equation:

$$t = \frac{d^2 \mu}{4 l \gamma} \frac{1}{60}$$

where:
t was the time elapsed in minutes
d was the distance traveled by the fluid along the microfluidic structure in meters;

TABLE 2

| Example | Substrate | Fluid | Fluid viscosity (Pa·s) | Run Time Horizontal (min) | Run Time Vertical (min) |
|---|---|---|---|---|---|
| 11 | 3M Scotchlite ™ Reflective Material | Dow Corning Poly(dimethylsiloxane) 200 ™ Fluid Blend | 546 | 9335 | 9167 |
| 12 | 3M Scotchlite ™ Reflective Material | Dow Corning Poly(dimethylsiloxane) 200 ™ Fluid Blend | 36 | 664 | 571 |
| 13 | Channeled Microstructured Substrate | Dow Corning Poly(dimethylsiloxane) 200 ™ Fluid Blend | 71 | 667 | 497 |
| 14 | Channeled Microstructured Substrate | Dow Corning Poly(dimethylsiloxane) 200 ™ Fluid | 5 | 42 | 29 |

Examples 15–18

A strip of the microstructured substrate Scotchlite™ Reflective Material Series 6200 High Gloss Film (commercially available from 3M Company, St. Paul, Minn.) 3 centimeters long by 1 centimeter wide was laminated with a piece of pressure sensitive adhesive tape [insert description]. This laminated construction was placed on a flat horizontal surface and the fluid that was a blend of Poly(dimethylsiloxane) 200 Fluids (commercially available from Dow Corning Corporation, Midland, Mich.) to give the viscosity shown in Table 1, was introduced into the fluid l was the effective opening size of the channels in the microstructured substrate laminate in meters, defined as described in Example 1;

γ was the surface tension of the fluid employed in Newtons per meter (N/m);

μ was the viscosity of the fluid in Pascal seconds (Pa·s).

All of the quantities defined above are known or were measured independently of each other. For this example: t was the independent variable, d was the dependent variable, l was $4.5 \times 10^{-6}$ m and γ was $21 \times 10^{-3}$ N/m.

TABLE 3

| Example | Substrate | Fluid | Distance Traveled (m) | Elapsed Time (min) | Predicted Elapsed Time (min) |
|---|---|---|---|---|---|
| 15 | 3M Scotchlite ™ Reflective Material | Dow Corning Poly(dimethylsiloxane) 200 ™ Fluid | 0.005 | 480 | 602 |
| 16 | 3M Scotchlite ™ Reflective Material | Dow Corning Poly(dimethylsiloxane) 200 ™ Fluid | 0.01 | 2040 | 2407 |
| 17 | 3M Scotchlite ™ Reflective Material | Dow Corning Poly(dimethylsiloxane) 200 ™ Fluid | 0.015 | 4920 | 5417 |
| 18 | 3M Scotchlite ™ Reflective Material | Dow Corning Poly(dimethylsiloxane) 200 ™ Fluid | 0.02 | 9335 | 9630 |

Examples 19–22

The same procedure described for Example 1 was followed with the microstructured substrate Scotchlite™ Reflective Material Series 6200 High Gloss Film (commercially available from 3M Company, St. Paul, Minn.) and a fluid that was a blend of Poly(dimethylsiloxane) 200™ Fluids (commercially available from Dow Corning Corporation, Midland, Mich.) to give the viscosity shown in Table 4. Measured and Predicted Run Times in minutes as a function of ambient temperature are shown in Table 4. Predicted Run Time was calculated using the model described in Example 1 with the following parameter values: d was 0.02 m, l was $4.5 \times 10^{-6}$ m, and $\gamma$ was $21 \times 10^{-3}$ N/m. The viscosity $\mu$ of the fluid (in Pa·s) at the various ambient temperatures was measured independently and is listed in Table 4.

sured and the predicted Run Times in minutes are shown in Table 5. Predicted Run Time was calculated using the model described in Example 1 with the following parameter values: d was 0.02 m, l was $4.5 \times 10^{6}$ m, $\mu$ was 955 Pa·s, and $\gamma$ was $23 \times 10^{-3}$ N/m.

Example 24

The same laminate described for Example 6 was prepared. This laminated construction was placed on a flat horizontal surface and the fluid of a given viscosity and activation energy $E_a$, a mixture of: 10% by weight Kraton G1750 (an ethylene-propylene star polymer, commercially available from Shell Corporation, Houston, Tex.); 40% by weight Regalrez 1085 (a hydrocarbon tackifier, commercially available from Hercules, Inc., Wilmington, Del.) and 50% by

TABLE 4

| Example | Substrate | Fluid | Ambient Temperature (° C.) | Fluid Viscosity (Pa·s) | Run Time (min) | Predicted Run Time (min) |
|---|---|---|---|---|---|---|
| 19 | 3M Scotchlite ™ Reflective Material | Dow Corning Poly(dimethylsiloxane) 200 ™ Fluid | 25 | 36 | 667 | 635 |
| 20 | 3M Scotchlite ™ Reflective Material | Dow Corning Poly(dimethylsiloxane) 200 ™ Fluid | 30 | 33 | 601 | 583 |
| 21 | 3M Scotchlite ™ Reflective Material | Dow Corning Poly(dimethylsiloxane) 200 ™ Fluid | 35 | 30 | 510 | 532 |
| 22 | 3M Scotchlite ™ Reflective Material | Dow Corning Poly(dimethylsiloxane) 200 ™ Fluid | 40 | 28 | 453 | 487 |

Example 23

The same laminate described for Example 6 was prepared. This laminated construction was placed on a flat horizontal surface and the fluid of a given viscosity and activation energy $E_a$ LIR 50 (an anionically polymerized polyisoprene linear polymer of approximately 50 kiloDalton molecular weight, from Kuraray Corporation, Ltd., Osaka, Japan) was introduced into the fluid flow channels by contacting the microstructured substrate laminate to a reservoir containing the fluid in order to start the indicator. To visualize the flow of the fluid along the microstructured substrate laminate the fluid was dyed using Solvent Blue 35 (commercially available from Aldrich Chemical Company, Milwaukee, Wis.). Progress of the fluid flow front with time was monitored through the use of a camera and imaging software. When the fluid had flowed 2 centimeters, the test was stopped and the time in minutes was recorded as the Run Time. The meaweight Mineral Oil (commercially available from Aldrich Chemical Company, Milwaukee, Wis.) was introduced into the fluid flow channels by contacting the microstructured substrate laminate to a reservoir containing the fluid in order to start the indicator. To visualize the flow of the fluid along the microstructured substrate laminate the fluid was dyed using Solvent Blue 35 (commercially available from Aldrich Chemical Company, Milwaukee, Wis.). Progress of the fluid flow front with time was monitored through the use of a camera and imaging software. When the fluid had flowed 2 centimeters, the test was stopped and the time in minutes was recorded as the Run Time. The measured and the predicted Run Times in minutes are shown in Table 5. Predicted Run Time was calculated using the model described in Example 1 with the following parameter values: d was 0.02 cm, l was $4.5 \times 10$ m, $\mu$ was 200 Pa·s, and $\gamma$ was $23 \times 10^{-3}$ N/m.

TABLE 5

| Example | Substrate | Fluid | Fluid Ea (kcal/mole) | Fluid Viscosity (Pa·s) | Run Time (min) | Predicted Run Time (min) |
|---|---|---|---|---|---|---|
| 23 | Channeled Microstructured Substrate | LIR 50 | 14.2 | 955 | 8613 | 7656 |

TABLE 5-continued

| Example | Substrate | Fluid | Fluid Ea (kcal/mole) | Fluid Viscosity (Pa·s) | Run Time (min) | Predicted Run Time (min) |
|---|---|---|---|---|---|---|
| 24 | Channeled Microstructured Substrate | Kraton G1750/ Regalrez 1085/ Mineral Oil | 18.5 | 200 | 1764 | 1603 |

Example 25

A timer label was constructed by: (1) constructing a laminate as in Example 1, (2) enclosing the fluid as described in Example 1 in a polypropylene pouch approximately 1 centimeter in diameter, (3) placing the laminate (with the microstructured substrate facing up) and the pouch on the sticky side of a 3 centimeters by 6 centimeters piece of 845 Book Tape (commercially available from 3M Company, St. Paul, Minn.), such that the pouch was at one end of the laminate, (4) sealing the entire assembly from (3) by covering it with a 3 centimeters by 6 centimeters piece of Nexcare™ Tegaderm Transparent Dressing (commercially available from 3M Company, St. Paul, Minn.), (sticky side down). In this construction the laminate and the pouch were effectively sandwich between the adhesive layers of the 845 Book Tape on the bottom, and the Nexcare Tegaderm™ Transparent Dressing on the top. The label was activated by applying finger pressure directly to the pouch containing the fluid and rupturing it. Once the pouch was ruptured the fluid contacted the end of the microstructured substrate laminate and began to flow into the channels of the laminate. Immediately after activation, the label was placed on an horizontal surface, and as in Example 1, progress of the fluid flow front with time was monitored through the use of a camera and imaging software. Fluid flow was also readily observable with the unaided eye. When the fluid had flowed 2 centimeters, the test was stopped and the time in minutes was recorded as the Run Time. The measured and predicted Run Times in minutes are shown in Table 6. Predicted Run Time was calculated using the model described in Example 1 with the following parameter values: d was 0.02 m, l was $4.5 \times 10^{-6}$ m. $\mu$ was 36 Pa·s, and $\gamma$ was $21 \times 10^{-3}$ N/m.

Example 26

A timer label was constructed as described in Example 25. The label was activated by applying finger pressure directly to the pouch containing the fluid and rupturing it. Once the pouch was ruptured the fluid contacted the end of the microstructured substrate laminate and began to flow into the channels of the laminate. Immediately after activation, the label was placed on a vertical surface, and as in Example 25, progress of the fluid flow front with time was monitored through the use of a camera and imaging software. When the fluid had flowed 2 centimeters, the test was stopped and the time in minutes was recorded as the Run Time. The measured and predicted Run Times in minutes are shown in Table 6. Predicted Run Time was calculated using the model described in Example 1 with the following parameter values: d was 0.02 m, l was $4.5 \times 10^{-6}$ m, $\mu$ was 36 Pa·s, and $\gamma$ was $21 \times 10^{-3}$ N/m.

TABLE 6

| Example | Substrate | Fluid | Fluid viscosity (Pa·s) | Run Time (minutes) | Predicted Run Time (minutes) |
|---|---|---|---|---|---|
| 25 | Tape label construction (horizontal) | Dow Corning Poly(dimethylsiloxane) 200 ™ Fluid | 36 | 684 | 635 |
| 26 | Tape label construction (vertical) | Dow Corning Poly(dimethylsiloxane) 200 ™ Fluid | 36 | 602 | 635 |

The present invention has now been described with reference to several embodiments thereof. The foregoing detailed description has been given for clarity of understanding only. No unnecessary limitations are to be understood therefrom. Many changes can be made in the embodiments described without departing from the scope of the invention. Thus, the scope of the present invention should not be limited to the exact details and structures described herein, but rather by the structures described by the language of the claims, and the equivalents of those structures.

It is claimed:

1. An article comprising:
    (a) a substrate having a microstructured surface, wherein the microstructured surface of the substrate defines a plurality of channels having a predetermined channel pattern;
    (b) a fluid wherein the fluid is separated from the substrate until activation of the article is desired;
    wherein the article is designed such that it can be manipulated at a desired point in time to allow contact of the fluid with at least some of the channels of the substrate in order to activate the article; and
    wherein the article is designed in such a manner as to provide an indication of the progress of fluid as it migrates through the channels of the substrate.

2. The article of claim 1 wherein the article comprises only one fluid and only one substrate.

3. The article of claim 1 wherein the channels of the substrate are interconnected.

4. The article of claim 1 wherein the fluid is selected from the group of consisting of viscous fluids, viscoelastic fluids, and combinations thereof.

5. The article of claim 1 wherein the substrate is retroreflective.

6. The article of claim 1 wherein the substrate is cube-corner retroreflective sheeting.

7. The article of claim 1 wherein the substrate is retroreflective and wherein the progress of the fluid as it migrates through the channels is evidenced by frustration of the total internal reflectance in the retroreflective substrate.

8. The article of claim 1 wherein the article is designed such that there is essentially no leakage of the fluid from the article prior to or subsequent to activation.

9. The article of claim 1 wherein the fluid has a fluid flow front as it migrates through the channels and wherein each fluid front variation is less than about 5 mm.

10. The article of claim 1 wherein the fluid has a fluid flow front as it migrates through the channels and wherein each fluid front variation is less than about 3 mm.

11. The article of claim 1 wherein the fluid has a fluid flow front as it migrates through the channels and wherein each fluid front variation is less than about 1 mm.

12. The article of claim 1 wherein the article is a timer.

13. The article of claim 1 wherein the article is a timer which according to the Capillary Action Test Method displays a time when in a vertical position that is within about ±50 percent of an identical timer in a horizontal position.

14. The article of claim 1 wherein the article is a timer which according to the Capillary Action Test Method displays a time when in a vertical position within about ±25 percent of an identical timer in a horizontal position.

15. The article of claim 1 wherein the article is a timer which according to the Capillary Action Test Method displays a time when in a vertical position that is within about ±10 percent of an identical timer in a horizontal position.

16. The article of claim 1 wherein the article is a timer and wherein the article displays a time at an expiration point that is within about ±25 percent of the actual elapsed time.

17. The article of claim 1 wherein the article is a timer and wherein the article displays a time at an expiration point that is within about ±10 percent of the actual elapsed time.

18. The article of claim 1 wherein the article is a timer and wherein the article displays a time at an expiration point that is within about ±5 percent of the actual elapsed time.

19. The article of claim 1 wherein the substrate has two opposing major surfaces, one being identified as the first major surface and the other being identified as the second major surface, wherein the second major surface has a series of essentially parallel channels therein, wherein the channels are essentially of uniform length and uniform shape.

20. The article of claim 1 wherein the fluid is separated from the substrate by a barrier until activation of the article is desired, wherein the barrier can subsequently be manipulated at a desired point in time to allow contact of the fluid with at least some of the channels of the substrate.

21. The article of claim 1, wherein the substrate has diffractive properties.

22. The article of claim 1, wherein the substrate has diffusive properties.

23. The article of claim 1, wherein the substrate is partially internally reflective.

24. The article of claim 1, wherein the substrate has optical characteristics and wherein the progress of the fluid as it migrates through the channels of the substrate is evidenced by the frustration of the optical characteristics of the substrate.

* * * * *

UNITED STATES PATENT AND TRADEMARK OFFICE
CERTIFICATE OF CORRECTION

| | |
|---|---|
| PATENT NO. | : 6,741,523 B1 |
| APPLICATION NO. | : 09/570785 |
| DATED | : May 25, 2004 |
| INVENTOR(S) | : Marco G. Bommarito |

It is certified that error appears in the above-identified patent and that said Letters Patent is hereby corrected as shown below:

Column 8
Line 49, delete "preerably" and insert in place thereof -- preferably --
Line 58, delete "10" and insert in place thereof -- ±10 --

Column 9
Line 54 – Line 56, after "substrates" delete "In another embodiment of the invention the article may comprise a plurality of substrates"

Column 12
Line 23, delete "30%" and insert in place thereof -- ±30% --

Column 16
Line 55, delete "nucrons" and insert in place thereof -- microns --

Column 18
Line 63, after "invention" insert -- . --

Column 19
Line 32, after "in" delete "the"
Line 67, delete "Nm" and insert in place thereof -- N/m --

Column 20
Line 10, delete "I" and insert in place thereof -- 1 --

Column 23
Line 49, delete "throughs" and insert in place thereof -- through --

Column 38
Line 31, after "SURFACE" insert -- ENERGY --

Column 40
Line 21, delete "Coming" and insert in place thereof -- Corning --
Line 35, delete "Coming" and insert in place thereof -- Corning --

Column 45
Line 4, delete "Scotchilte" and insert in place thereof -- Scotchlite --

UNITED STATES PATENT AND TRADEMARK OFFICE
CERTIFICATE OF CORRECTION

PATENT NO.        : 6,741,523 B1
APPLICATION NO.   : 09/570785
DATED             : May 25, 2004
INVENTOR(S)       : Marco G. Bommarito It is certified that error appears in the above-identified patent and that said Letters Patent is hereby corrected as shown below:

Column 48
Claim 1, Line 57, delete "the progress of fluid" and insert in place thereof
-- progress of the fluid --

Signed and Sealed this

Twenty-seventh Day of February, 2007

JON W. DUDAS
*Director of the United States Patent and Trademark Office*